US008085520B2

(12) United States Patent
Ramarge et al.

(10) Patent No.: US 8,085,520 B2
(45) Date of Patent: Dec. 27, 2011

(54) MANUFACTURING PROCESS FOR SURGE ARRESTER MODULE USING PRE-IMPREGNATED COMPOSITE

(75) Inventors: Michael M. Ramarge, Olean, NY (US); Alan P. Yerges, Muskego, WI (US); David P. Bailey, Portville, NY (US); Roger S. Perkins, Shanghai (CN)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 12/761,475

(22) Filed: Apr. 16, 2010

(65) Prior Publication Data

US 2010/0194520 A1 Aug. 5, 2010

Related U.S. Application Data

(63) Continuation of application No. 10/762,290, filed on Jan. 23, 2004.

(51) Int. Cl.
*H02H 1/00* (2006.01)

(52) U.S. Cl. ........................................ 361/117; 361/127

(58) Field of Classification Search .......... 361/117–120, 361/127

See application file for complete search history.

(56) References Cited

U.S. PATENT DOCUMENTS

| | | | |
|---|---|---|---|
| 3,913,127 | A | 10/1975 | Suzuki et al. |
| 4,272,411 | A | 6/1981 | Sokoly et al. |
| 4,282,557 | A | 8/1981 | Stetson |
| 4,296,002 | A | 10/1981 | Sokoly et al. |
| 4,298,900 | A | 11/1981 | Avdeenko et al. |
| 4,352,140 | A | 9/1982 | Axelsson et al. |
| 4,388,603 | A | 6/1983 | Hassler et al. |
| 4,404,614 | A | 9/1983 | Koch et al. |
| 4,444,351 | A | 4/1984 | Dries et al. |
| 4,456,942 | A | 6/1984 | Bronikowski |
| 4,656,555 | A | 4/1987 | Raudabaugh |
| 4,729,053 | A | 3/1988 | Maier et al. |
| 4,779,162 | A | 10/1988 | Beitz et al. |
| 4,780,598 | A | 10/1988 | Fahey et al. |
| 4,825,188 | A | 4/1989 | Parraud et al. |
| 4,833,438 | A | 5/1989 | Parraud et al. |
| 4,851,955 | A | 7/1989 | Doone et al. |
| 4,899,248 | A | 2/1990 | Raudabaugh |

(Continued)

FOREIGN PATENT DOCUMENTS

DE 3 334 533 4/1985

(Continued)

OTHER PUBLICATIONS

PCT International Search Report for International Application No. PCT/US05/02252, mailed Oct. 4, 2006, 6 pages.

(Continued)

*Primary Examiner* — Danny Nguyen

(74) *Attorney, Agent, or Firm* — Fish & Richardson P.C.

(57) ABSTRACT

An electrical module assembly used in a surge arrester is manufactured by wrapping an electrical module assembly including at least one metal oxide varistor (MOV) disk to which a reinforcing structure including a pre-impregnated epoxy/glass-fiber composite has been applied with shrink film and compacting the wrapped electrical module assembly by heating the shrink film such that the shrink film shrinks and applies a radially compressive force to the electrical module assembly. The wrapped electrical module assembly then is cured at a temperature at which the shrink film no longer applies a compressive force.

22 Claims, 19 Drawing Sheets

U.S. PATENT DOCUMENTS

| | | | | |
|---|---|---|---|---|
| 4,962,440 | A | 10/1990 | Johnnerfelt et al. | |
| 4,992,906 | A | 2/1991 | Doone et al. | |
| 5,003,689 | A | 4/1991 | Doone et al. | |
| 5,008,646 | A | 4/1991 | Hennings et al. | |
| 5,043,838 | A | 8/1991 | Sakich | |
| 5,047,891 | A | 9/1991 | Nedriga | |
| 5,128,824 | A | 7/1992 | Yaworski et al. | |
| 5,159,748 | A | 11/1992 | Doone et al. | |
| 5,218,508 | A | 6/1993 | Doone | |
| 5,220,480 | A | 6/1993 | Kershaw, Jr. et al. | |
| 5,225,265 | A | 7/1993 | Prandy et al. | |
| 5,237,482 | A | 8/1993 | Osterhout et al. | |
| 5,291,366 | A | 3/1994 | Giese et al. | |
| 5,313,184 | A | 5/1994 | Greuter et al. | |
| 5,363,266 | A | 11/1994 | Wiseman et al. | |
| 5,497,138 | A | 3/1996 | Malpiece et al. | |
| 5,570,264 | A | 10/1996 | Lundquist et al. | |
| 5,602,710 | A | 2/1997 | Schmidt et al. | |
| 5,608,597 | A * | 3/1997 | Holmstrom et al. | 361/127 |
| 5,652,690 | A | 7/1997 | Mansfield et al. | |
| 5,802,814 | A | 9/1998 | Sano | |
| 5,807,509 | A | 9/1998 | Shrier et al. | |
| 5,842,096 | A | 11/1998 | Mabbott | |
| 5,912,611 | A | 6/1999 | Berggren et al. | |
| 5,923,518 | A | 7/1999 | Hensley | |
| 5,926,356 | A | 7/1999 | Sakich et al. | |
| 5,930,102 | A | 7/1999 | Rook | |
| 5,936,826 | A | 8/1999 | Schmidt | |
| 5,959,822 | A | 9/1999 | Bock et al. | |
| 5,990,778 | A | 11/1999 | Strümpler et al. | |
| 6,008,975 | A | 12/1999 | Kester et al. | |
| 6,008,977 | A | 12/1999 | Thatcher | |
| 6,185,813 | B1 | 2/2001 | Donnola | |
| 6,279,811 | B1 | 8/2001 | Ramarge et al. | |
| 6,396,676 | B1 | 5/2002 | Doone et al. | |
| 6,483,685 | B1 | 11/2002 | Ramarge et al. | |
| 7,272,885 | B2 * | 9/2007 | Hassanzadeh et al. | 29/612 |

FOREIGN PATENT DOCUMENTS

| | | |
|---|---|---|
| EP | 0 033 420 | 8/1981 |
| EP | 0 409 380 | 1/1991 |
| EP | 0 410 644 | 1/1991 |
| EP | 0 595 376 | 5/1994 |
| EP | 0 642 141 | 3/1995 |
| EP | 0 689 240 | 12/1995 |
| EP | 0 762 439 | 3/1997 |
| JP | 03-034522 | 2/1991 |
| JP | 11-340635 | 12/1999 |
| JP | 2003028351 | 1/2003 |
| JP | 2003318009 | 11/2003 |
| JP | 2004117231 | 4/2004 |
| JP | 2009277388 | 11/2009 |
| WO | WO 96/36977 | 11/1996 |
| WO | WO 96/41355 | 12/1996 |
| WO | WO 99/08353 | 2/1999 |
| WO | WO 99/18642 | 4/1999 |

OTHER PUBLICATIONS

PCT Written Opinion for International Application No. PCT/US05/02252, mailed Oct. 4, 2006, 8 pages.

European Search Report for European Application No. 05 706 069, mailed Dec. 23, 2009, 3 pages.

* cited by examiner

MANUFACTURING PROCESS FOR SURGE ARRESTER MODULE USING PRE-IMPREGNATED COMPOSITE

CROSS-REFERENCE TO RELATED APPLICATIONS

This application is a continuation (and claims the benefit of priority under 35 U.S.C. §120) of U.S. application Ser. No. 10/762,290, filed Jan. 23, 2004, and entitled "MANUFACTURING PROCESS FOR SURGE ARRESTER MODULE USING PRE-IMPREGNATED COMPOSITE." The contents of the prior application are incorporated herein in their entirety.

TECHNICAL FIELD

This document relates to surge arresters, and more particularly to a manufacturing process for surge arresters.

BACKGROUND

Electrical transmission and distribution equipment is subject to voltages within a fairly narrow range under normal operating conditions. However, system disturbances, such as lightning strikes and switching surges, may produce momentary or extended voltage levels that greatly exceed the levels experienced by the equipment during normal operating conditions. These voltage variations often are referred to as over-voltage conditions.

If not protected from over-voltage conditions, critical and expensive equipment, such as transformers, switching devices, computer equipment, and electrical machinery, may be damaged or destroyed by over-voltage conditions and associated current surges. Accordingly, it is routine practice for system designers to use surge arresters to protect system components from dangerous over-voltage conditions.

A surge arrester is a protective device that commonly is connected in parallel with a comparatively expensive piece of electrical equipment so as to shunt or divert over-voltage-induced current surges safely around the equipment, and thereby protect the equipment and its internal circuitry from damage. When exposed to an over-voltage condition, the surge arrester operates in a low impedance mode that provides a current path to electrical ground having a relatively low impedance. The surge arrester otherwise operates in a high impedance mode that provides a current path to ground having a relatively high impedance. The impedance of the current path is substantially lower than the impedance of the equipment being protected by the surge arrester when the surge arrester is operating in the low-impedance mode, and is otherwise substantially higher than the impedance of the protected equipment.

Upon completion of the over-voltage condition, the surge arrester returns to operation in the high impedance mode. This prevents normal current at the system frequency from following the surge current to ground along the current path through the surge arrester.

Conventional surge arresters typically include an elongated outer enclosure or housing made of an electrically insulating material, a pair of electrical terminals at opposite ends of the enclosure for connecting the arrester between a line-potential conductor and electrical ground, and one or more other electrical components that form a series electrical path between the terminals. These components typically include a stack of one or more voltage-dependent, nonlinear resistive elements that are referred to as varistors. A varistor is characterized by having a relatively high resistance when exposed to a normal operating voltage, and a much lower resistance when exposed to a larger voltage, such as is associated with over-voltage conditions. In addition to or in place of varistors, a surge arrester also may include one or more spark gap assemblies housed within the insulative enclosure and electrically connected in series with the varistors. Some arresters also include one or more electrically-conductive spacer elements coaxially aligned with the varistors and gap assemblies.

For proper arrester operation, contact must be maintained between the components of the stack. To accomplish this, it is known to apply an axial load to the one or more elements of the stack. Good axial contact is important to ensure a relatively low contact resistance between the adjacent faces of the elements, to ensure a relatively uniform current distribution through the elements, and to provide good heat transfer between the elements and the end terminals.

One way to apply this load is to employ springs within the housing to urge the one or more stacked elements into engagement with one another. Another way to apply the load is to encase the stack of one or more arrester elements in glass fibers so as to axially-compress the elements within the stack. For bonded disk stacks or monolithic disks with a sufficiently high rating, such as, for example, a rating greater than 6 kV, these methods are usually sufficient to sustain a static mechanical load but may not be sufficient to withstand the thermo-mechanical forces experienced by the one or more elements during a high current impulse such as, for example, a 100 kA impulse.

When the bonded disk stack or monolithic disk with a sufficiently high rating, such as, for example, a rating greater than 6 kV, is subjected to a high current impulse, the resulting thermo-mechanical forces tend to cause cracking of the surge arrester elements, which tend to crack in mid-plane when subjected to the thermo-mechanical forces of a high current impulse. For bonded disk stacks of more than one element, there also may be cracking near the center of the bonded disk column. The tendency of an element to crack during high current impulses limits the size of an individual surge arrester element as well as the overall length of a stack of bonded surge arrester elements. There generally is a height-diameter ratio where a monolithic disk or a bonded disk stack will be subject to thermo-mechanical failure due to a high current impulse, typically in the form of a crack at the mid-plane.

SUMMARY

In one general aspect, manufacturing an electrical module assembly includes axially compressing and heating an electrical module including at least one metal oxide varistor (MOV) disk. A reinforcing structure for application to the electrical module is prepared and wrapped around the electrical module to produce the electrical module assembly. Shrink film then is attached to the electrical module assembly, spiral wound around the electrical module assembly, and secured to the electrical module assembly. The shrink film then is heated such that the shrink film shrinks and applies a radial compressive force to the electrical module assembly. The reinforcing structure of the electrical module assembly then is cured in a manner in which the shrink film does not apply a radial compressive force to the electrical module assembly during the curing.

Implementations may include one or more of the following features. For example, curing the reinforcing structure such that the shrink film does not apply a compressive force may include heating the electrical module assembly at a temperature at which the shrink film does not apply a compressive force to the electrical module assembly. After curing, the electrical module assembly may be cooled and the shrink film may be removed from the electrical module assembly.

Curing the reinforcing structure such that the shrink film does not apply a compressive force may include, after heating the shrink film, cooling the electrical module assembly, removing the shrink film from the electrical module assembly, and curing the reinforcing structure after removing the shrink film.

Spiral winding the shrink film around the electrical module assembly may comprise spiral winding the film over the surface of the electrical module assembly while maintaining a substantially constant tension on the film.

Axial compression of the electrical module may be maintained through curing of the reinforcing structure.

In another general aspect, manufacturing an electrical module assembly includes providing an electrical module assembly including at least one MOV disk to which a reinforcing structure has been applied and wrapping the electrical module assembly with shrink film. The wrapped electrical module assembly then is compacted by heating the shrink film such that the shrink film shrinks and applies a radial compressive force to the electrical module assembly. The reinforcing structure of the wrapped electrical module assembly then is cured at a temperature at which the shrink film no longer applies a compressive force.

Implementations may include one or more of the following features. For example, the shrink film may be a bi-axially oriented polypropylene film. Compacting the wrapped electrical module assembly by heating the shrink film may include heating the shrink film at approximately 150 degrees Celsius for approximately 10 to 30 minutes, while curing the wrapped electrical module assembly may include heating the wrapped electrical module assembly at approximately 165 degrees Celsius for approximately 5 to 30 minutes.

Wrapping the electrical module assembly with shrink film may include attaching the shrink film to an end of the electrical module assembly, spiral winding the shrink film over the surface of the electrical module assembly while maintaining a substantially constant tension on the shrink film, and securing the shrink film at an opposite end of the electrical module assembly.

Curing the wrapped electrical module assembly at a temperature at which the shrink film no longer applies a compressive force may include heating the electrical module assembly at a temperature at which the shrink film does not apply a compressive force to the electrical module assembly. The electrical module assembly also may be cooled and the shrink film may be removed from the cooled electrical module assembly.

Curing the wrapped electrical module assembly at a temperature at which the shrink film no longer applies a compressive force may include, after heating the shrink film, cooling the electrical module assembly, removing the shrink film from the electrical module assembly, and curing the electrical module assembly without the shrink film.

Providing the electrical module assembly may include placing at least one MOV disk within the electrical module assembly, compressing the electrical module assembly, and wrapping the MOV disks with a reinforcing structure, such as a pre-impregnated fiber composite. Compressing the electrical module assembly may include compressing the electrical module assembly using axial pressure of 250 pounds or more. The axial compression may be maintained during curing. Prior to wrapping the MOV disks, the electrical module assembly may be heated to a surface temperature of approximately 49 degrees Celsius.

In yet another general aspect, manufacturing an electrical module assembly includes attaching tape to an end of the electrical module assembly including at least one MOV disk to which a reinforcing structure has been applied, spiral winding the tape over the surface of the electrical module assembly while maintaining a substantially constant tension on the tape, and securing the tape at an opposite end of the electrical module assembly. The electrical module assembly then is heated such that the tension of the tape compresses the electrical module assembly, and the wrapped electrical module assembly is cured at a temperature at which the tape does not apply a compressive force to the electrical module assembly.

Implementations may include one or more of the features noted above.

DESCRIPTION OF DRAWINGS

Like reference symbols in the various drawings indicate like elements.

DETAILED DESCRIPTION

Figure 1:
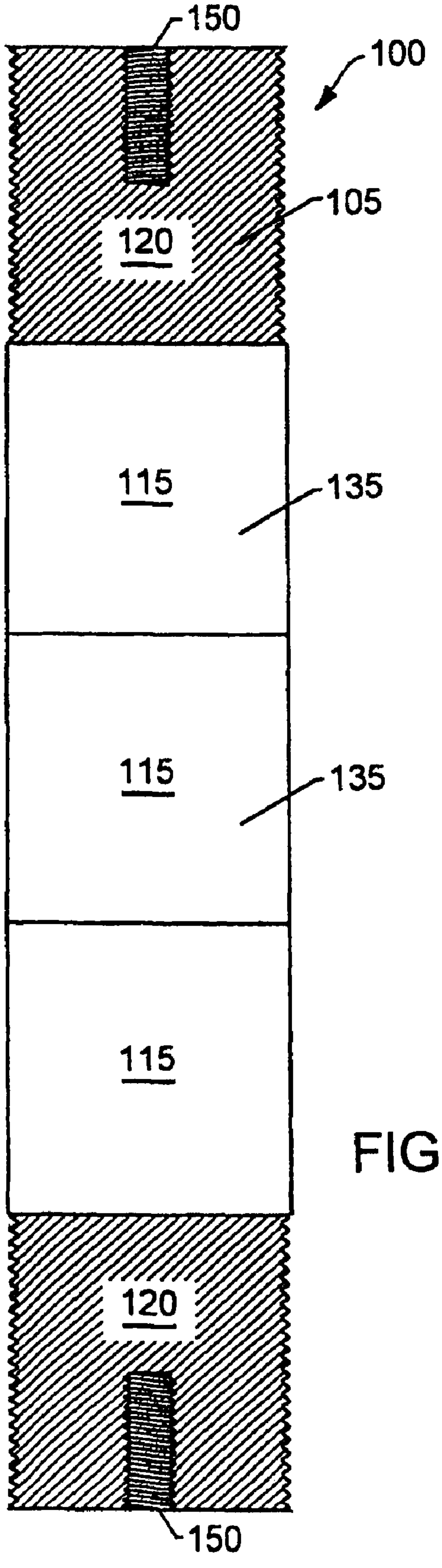
FIG. 1 is a cross-sectional view of a bonded electrical component module showing joints between adjacent electrical components.
Figure 2:
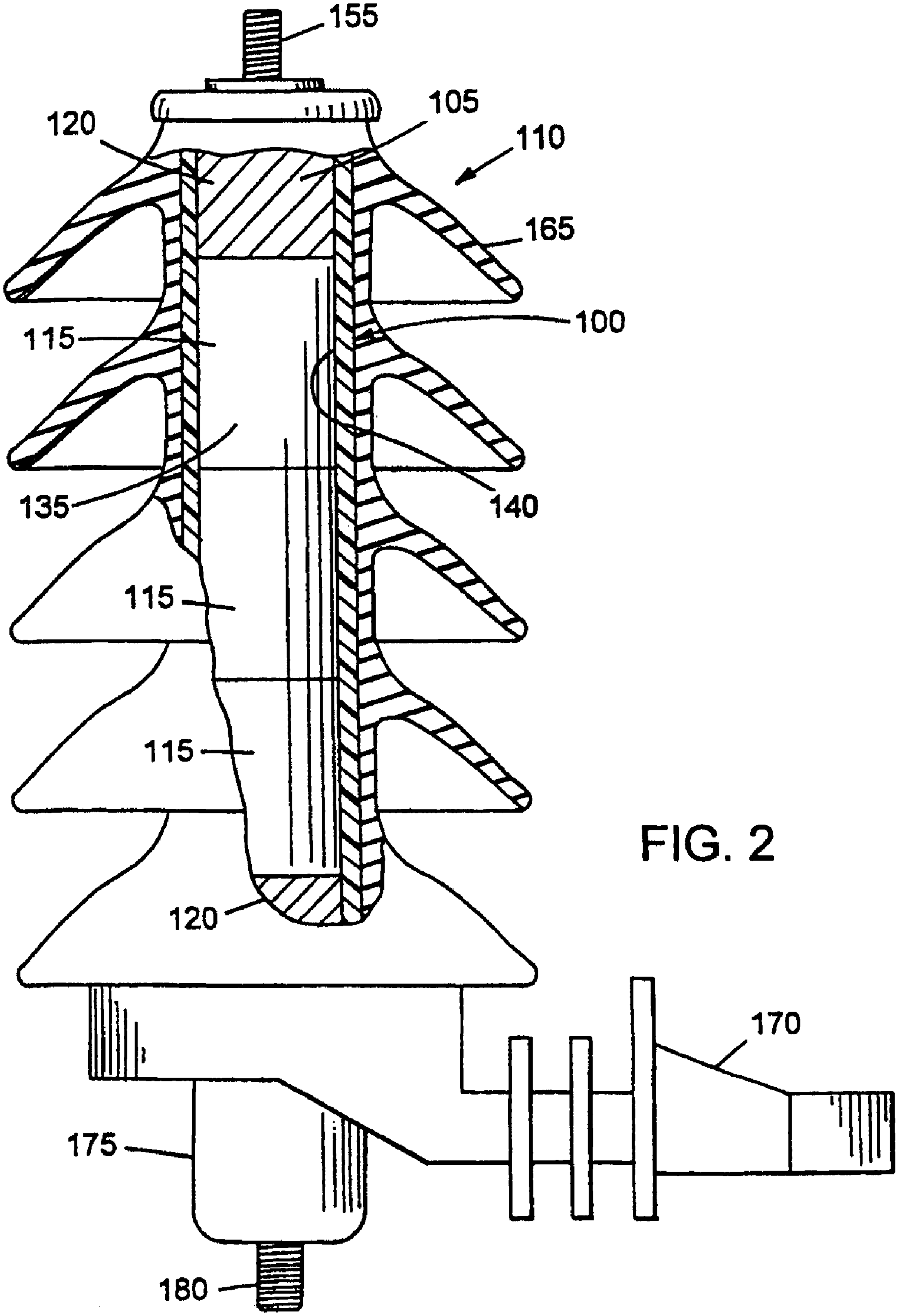
FIG. 2 is a partial cross-sectional view of the bonded electrical component module of FIG. 1 in a surge arrester.

Referring to FIGS. 1 and 2, an electrical component module 100 includes a bonded element stack 105 that serves as both the electrically-active component and the mechanical support component of a surge arrester 110. It is desirable for the bonded element stack 105 to exhibit surge durability that enables the stack to withstand high current, short duration conditions, or other required impulse duties. For example, in one implementation of a stack for use in heavy duty distribution arresters, it is desirable to have a stack capable of withstanding 100 kA pulses with durations of 4/10 microseconds, where 4/10 indicates that a pulse takes 4 microseconds to reach 90% of its peak value and 10 microseconds more to get back down to 50% of its peak value. As described below in detail, the electrical component module 100 may be reinforced to enable it to better withstand the thermo-mechanical shock of a higher current impulse.

Elements 115 of the bonded element stack 105 are stacked in an end-to-end relationship and bonded together at their end surfaces. Since the elements 115 of the stack 105 are affirmatively bound together, the arrester 110 does not need to include a mechanism or structure for applying an axial load to the elements. The bonding supplies sufficient mechanical strength for a static load.

The surge arrester 110 may be implemented as any class of surge arrester, including a station, intermediate, or distribution class surge arrester. For example, in distribution class systems, a monolithic element having a rated capability from approximately 6 kV up to approximately 9 kV may be used. A bonded disk stack may include, for example, multiples of 3 kV, 6 kV, or 9 kV elements bonded together. However, other values such as 1 kV or 10 kV may be used for the individual element, and the arrester is not limited to any particular combination of voltage ratings. It should also be understood that the module 100 may be used in other types of surge arresters, and in other electrical protective equipment.

The bonded element stack 105 may include different numbers of elements 115, and elements 115 of different sizes or types. Examples include varistors, capacitors, thyristors, thermistors, and resistors. Typically, the elements 115 are cylindrical, though the elements 115 may include other shapes as well. For purposes of explanation, the stack is shown as including three metal oxide varistors ("MOVs") 115 and a pair of terminals 120.

Figure 3:
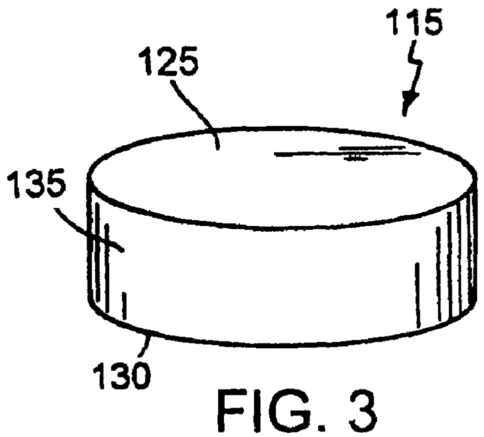
FIG. 3 is a perspective view of one varistor (MOV disk) of the bonded electrical component module of FIGS. 1 and 2.

Referring also to FIG. 3, each MOV 115 is made of a metal oxide ceramic formed into a short cylindrical disk having an upper face 125, a lower face 130, and an outer cylindrical surface 135. The metal oxide ceramic used in the MOV 115 may be of the same material formulation used for any MOV disk.

The MOVs may be sized according to the desired application. For example, in one set of implementations, the MOV may have a diameter between approximately 1 to 3 inches, such that the upper and lower faces 125 and 130 each have surface areas of between about 0.785 and 7.07 square inches.

Given a particular metal oxide formulation and a uniform or consistent microstructure throughout the MOV, the thickness of the MOV determines the operating voltage level of the MOV. In one implementation, each MOV is about 0.75 inches thick. In some implementations, this thickness may be tripled.

It is desirable to minimize the cross-sectional areas of the MOVs so as to minimize the size, weight and cost of the arrester. However, the durability and recoverability of the MOVs tend to be directly related to the sizes of the MOVs. In view of these competing considerations, MOVs having diameters of approximately 1.6 inches have been used.

The upper and lower faces 125 and 130 may be metallized using, for example, sprayed-on coatings of molten aluminum or brass. In some implementations, these coatings have a thickness of approximately 0.002 to 0.010 inches. The outer cylindrical surface 135 is covered by an insulative collar.

A terminal 120 is disposed at each end of the stack 105. Each terminal 120 typically is a relatively short, cylindrical block formed from a conductive material, such as, for example, aluminum. Each terminal 120 has a diameter substantially equal to that of an MOV 115. In some implementations, each terminal also may include a threaded bore 150 in which may be positioned a threaded conductive stud 155. In general, the terminals 120 may be thinner than terminals associated with modules that, for example, are encased within a structural layer to provide an axial load on the components of the module. This reduced thickness may result from changes in the geometry of the device, or simply because thicker metal is not needed for bonding with the structural layer.

As shown in FIG. 2, the surge arrester 110 includes the electrical component module 100, a polymeric or ceramic housing 165, and an arrester hanger 170. The module 100 is disposed within the housing 165. An insulating or dielectric compound (not shown), such as room temperature vulcanized silicone, fills any voids between the module 100 and the inner surface 140 of the housing 165. A threaded conductive stud 155 is disposed in the bore 150 of each terminal 120. The upper stud 155 typically extends beyond the housing 165 and includes threads for engaging a terminal assembly (not shown). The lower stud 155 typically extends through an aperture (not shown) in hanger 170 for connection to a ground lead disconnector 175. A threaded stud 180 extends from the disconnector 175 to engage a ground lead terminal assembly (not shown). The housing 165 is sealed about the upper and lower ends of the module 100.

As noted above, elements of the bonded element stack 105 may be bonded together at their end faces, such that the stack 105 serves as both the electrically-active component and the mechanical support structure of an electrical protective device, such as the surge arrester 110. The bonding provides a mechanically-compliant, electrically-conductive joint between the MOVs, which reduces the deleterious effects of the thermo-mechanical forces associated with service operating conditions and thus lengthens the expected service life of the surge arrester.

The bonding may be implemented to form a mechanically-compliant joint using combinations of electrically-conductive materials and mechanically-compliant materials. In general, the joint reduces or dampens axial tensile forces by having a Young's modulus substantially below that of the disks that the joint separates and bonds. For example, the necessary compliance of the joint is achieved by the joint having a Young's modulus that is less than half of the Young's modulus of the MOV disk. More particularly, the Young's modulus of the joint may be between approximately one-eightieth and one-tenth of the Young's modulus of the electrical components separated by the joint. Even more particularly, the Young's modulus of the joint may be approximately one-fortieth of the Young's modulus of the electrical components. For example, in one implementation, the disks have a Young's modulus of 16,000,000 pounds per square inch (psi), and the joint has a Young's modulus of approximately 400,000 psi. In some applications, the joint will have a thickness of approximately 0.25 inches. The bonding joint also may be implemented using a single material that is electrically-conductive and mechanically-compliant. The MOV disks optionally may be metallized with, for example, copper, aluminum, or brass. Examples of the electrically-conductive and mechanically-compliant joint are described in U.S. Pat. No. 6,483,685, by Michael M. Ramarge, David P. Bailey, Thomas C. Hartman, Roger S. Perkins, Alan P. Yerges, Michael G. Scharrer, and Lisa C. Sletson, titled "Compliant Joint Between Electrical Components," which is incorporated by reference.

In the above examples, the adhesive can be, for example, a polymer, such as a polyimide, polyamide, polyester, polyurethane, elastomer, silicone, or epoxy. The adhesive can be made electrically-conductive by adding a conductive material, such as silver, a silver alloy, and/or carbon black. The polymer and polymer composite laminates of the examples described above also can be one or more of the polymers listed above. The polymer composite laminates may be fiber reinforced, or formulated with fillers, such as reinforcing fillers to modify the mechanical properties of the laminate, or extending fillers to modify the physical properties of the laminate. The polymers and polymer composite laminates can be made electrically-conductive by adding conductive materials, such as silver, silver alloys, and/or carbon black.

In general, the joints described above will function between any pair of components in which a mechanically-compliant and electrically-conductive joint is necessary or desirable. For example, the joints described above can be formed between different electrical components, such as between an end terminal and a MOV disk.

Figure 4:
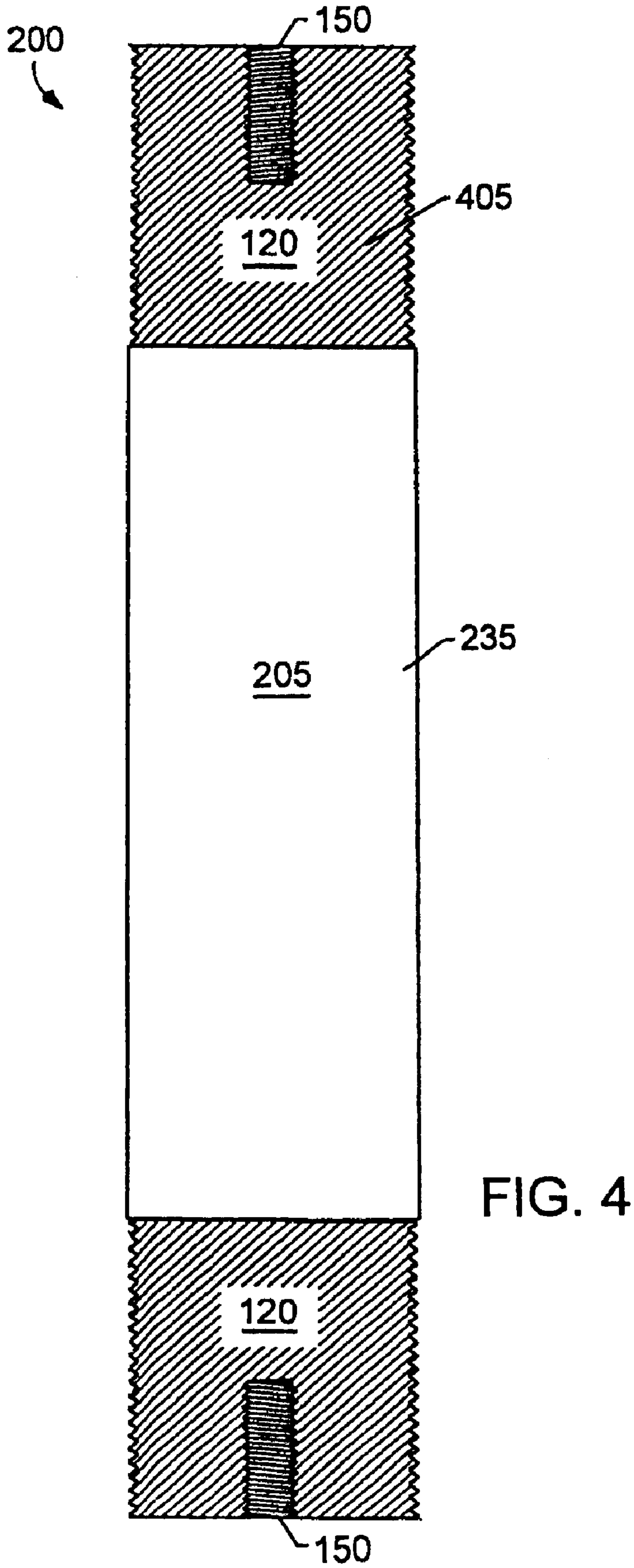
FIG. 4 is a cross-sectional view of an electrical component module showing a monolithic electrical component.
Figure 5:
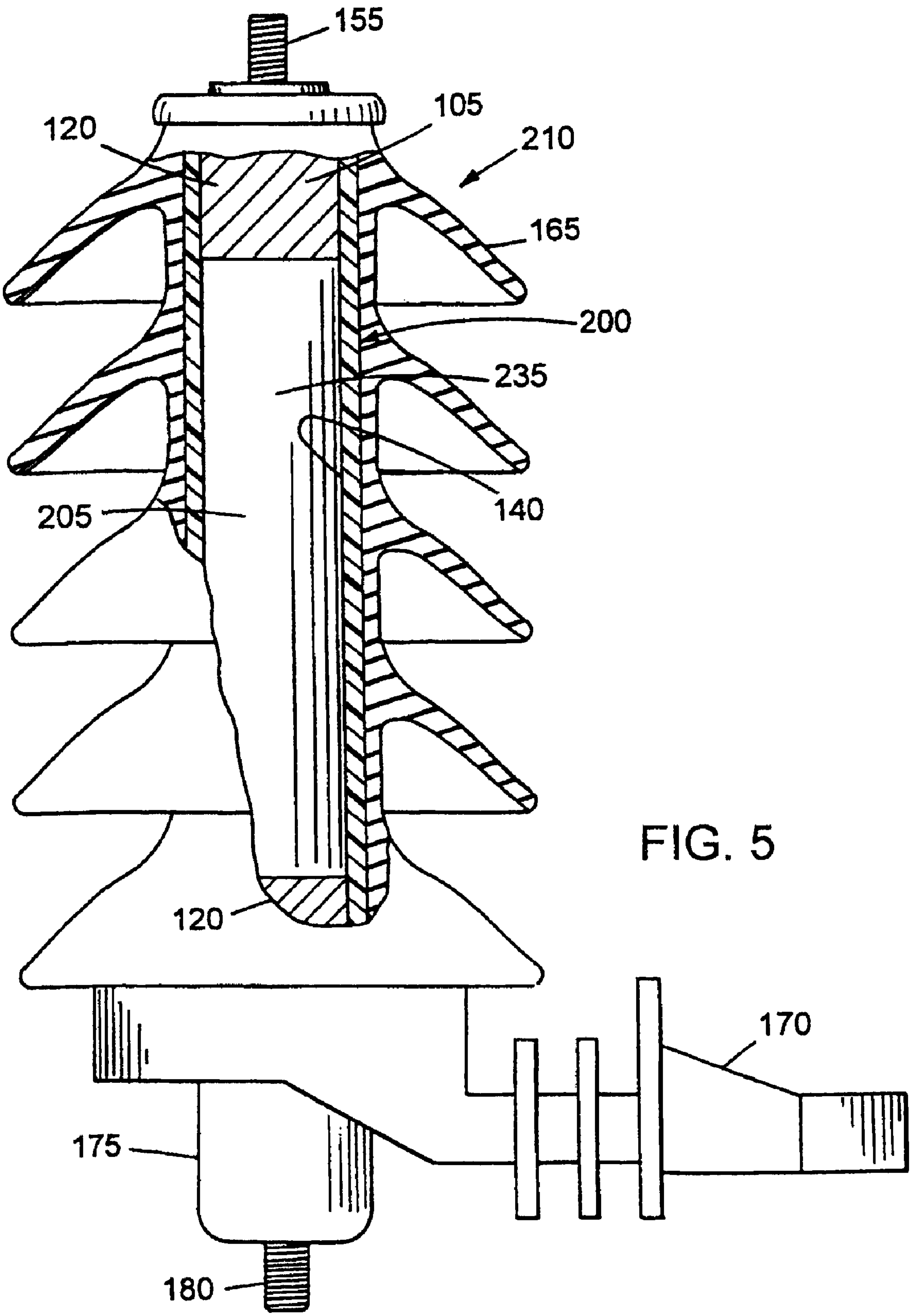
FIG. 5 is a partial cross-sectional view of the monolithic electrical component module of FIG. 4 in a surge arrester.

Referring to FIGS. 4 and 5, an electrical component module 200 includes a monolithic element 205 that serves as both the electrically-active component and the mechanical support component of a surge arrester 210. The monolithic element 205 may be used in place of the bonded disk stack 105 of FIGS. 1 and 2. The element 205 exhibits surge durability, in that it can normally withstand high current, short duration conditions, or other required impulse duties. Moreover, since the element 205 is a single piece, the arrester 210 does not need to include a mechanism or structure for applying an axial load for mechanical support in static conditions. The monolithic element 205 supplies sufficient mechanical strength for a static load.

The length or thickness of a monolithic element is limited because the thermo-mechanical forces associated with some impulses will crack the element. For example, because of the likelihood of cracking, most monolithic elements do not exceed a rating of 9 kV. As described below in detail, the electrical component module 200 may be reinforced to enable it to better withstand the thermo-mechanical shock of a high current impulse. In this manner, the monolithic element can be lengthened beyond the length of conventional 9 kV monolithic elements. The ability to use longer monolithic elements provides considerable cost savings in the manufacture of the elements and the manufacture of surge arresters incorporating the monolithic elements.

Like the surge arrester 110, the surge arrester 210 may be implemented as any class of surge arrester, including a station, an intermediate, and a distribution class surge arrester. For example, a monolithic element typically may be used in distribution systems of up to approximately 6 kV to approximately 9 kV. As noted above, a monolithic element with a rating greater than 9 kV has an increased likelihood of cracking during an impulse. Thus, monolithic elements having a rating greater than 9 kV generally are not used in conventional applications. It should be understood that the module 200 may be used in other types of surge arresters, and in other electrical protective equipment.

The monolithic element 205 may be configured in different sizes or types, such as varistors, capacitors, thyristors, thermistors, and resistors. Typically, the element 205 is cylindrical, though the element 205 may be configured in other shapes as well. For purposes of explanation, the surge arrester 210 is shown as including a single monolithic MOV 205 and one pair of terminals 120.

Figure 6:
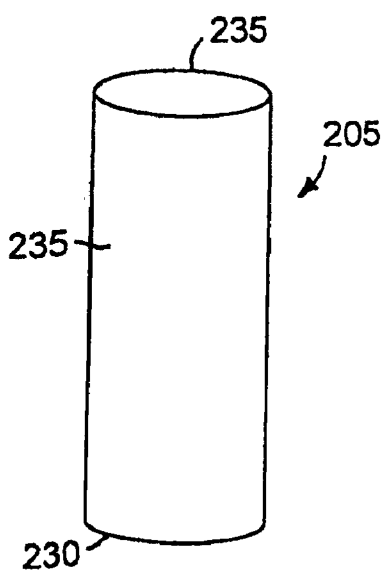
FIG. 6 is a perspective view of the monolithic varistor (MOV disk) of the electrical component module of FIGS. 4 and 5.

Referring also to FIG. 6, the monolithic MOVs 205, like the MOVs 115, is made of a metal oxide ceramic formed into a short cylindrical disk having an upper face 225, a lower face 230, and an outer cylindrical surface 235. The metal oxide ceramic used in the MOV 205 may be of the same material formulation used for any MOV disk. Also like the MOVs 115, the monolithic MOV 205 may be sized according to the desired application. For example, in one set of implementations, the monolithic MOV 205 may have a diameter between approximately one to three inches, such that the upper and lower faces 225 and 230 each have surface areas of between about 0.785 and 7.07 square inches.

Given a particular metal oxide formulation and a uniform or consistent microstructure throughout the monolithic MOV 205, the thickness of the monolithic MOV determines its operating voltage level. In one implementation, the monolithic MOV 205 is about three to six inches thick. In some implementations, this thickness may be increased by, for example, as much as three inches.

A terminal 120 is disposed at each end of the monolithic MOV 205. The terminals 120 may have any or all of the features described above. For example, each terminal 120 may have a diameter substantially equal to that of the monolithic MOV 205.

As shown in FIG. 5, the surge arrester 210 includes the electrical component module 200, and, like the surge arrester 110, the polymeric or ceramic housing 165 and the arrester hanger 170. The module 200 is disposed within the housing 165. Similarly, an insulating or dielectric compound (not shown), such as room temperature vulcanized silicone, fills any voids between the module 200 and the inner surface 140 of the housing 165. The threaded conductive stud 155 is disposed in the bore 150 of each terminal 120. The upper stud 155 typically extends beyond the housing 165 and includes threads for engaging a terminal assembly (not shown). The lower stud 155 typically extends through an aperture (not shown) in hanger 170 for connection to the ground lead disconnector 175. The threaded stud 180 extends from the disconnector 175 to engage a ground lead terminal assembly (not shown). The housing 165 is sealed about the upper and lower ends of the module 200.

Referring to FIGS. 7-15, a reinforced electrical component module 300 of a surge arrester includes the bonded disk stack 105 and a reinforcing structure 305. The reinforced electrical component module 300 may be installed in the surge arrester 110 and may be disposed within the housing 165, as shown in FIG. 2 and described above. As described above in detail with respect to the surge arrester 110, the electrical component module 100 may be a bonded element stack 105 of, for example, several MOV disks 115. Although the bonded element stack 105 has sufficient mechanical strength to withstand a static load during normal operation, cracking can occur during the thermo-mechanical shock sustained during high current impulses. The cracking tends to occur at the center of the stack, and may occur, for example, at the interface between elements or at the center of the middle element. The maximum force tends to occur in the middle of the bonded disk stack. Because of the small bond line, the bonded stack has the same natural frequency of a monolithic element of equal length. The tendency of a long disk stack to crack in the middle during a high current impulse limits the length of the stack.

The reinforcing structure 305 provides mechanical reinforcement to the reinforced electrical component module 300 to permit the module to withstand the thermo-mechanical shock of a high current impulse. The structure 305 may provide mechanical reinforcement to the entire module 300 or to a selected portion of the module 300. The reinforcing structure 305 typically provides constraining forces in the axial direction and/or the circumferential direction of the reinforced electrical component module 300. The constraining forces provided by the reinforcing structure 305 are sufficient to allow the reinforced module 300 to withstand the thermo-mechanical shock of a high current impulse without cracking. More particularly, the reinforcing structure 305 allows the reinforced electrical component module 300 to withstand a larger thermo-mechanical shock than could be withstood by an equivalent non-reinforced electrical component module 100.

Figure 11:
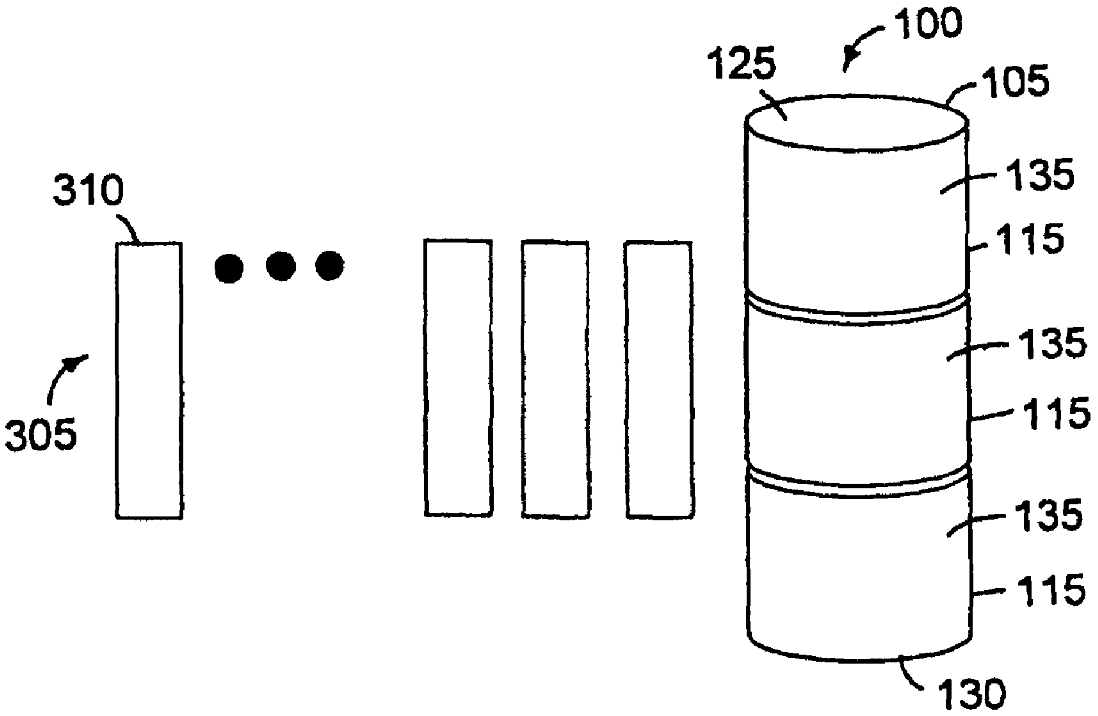
Figure 13:
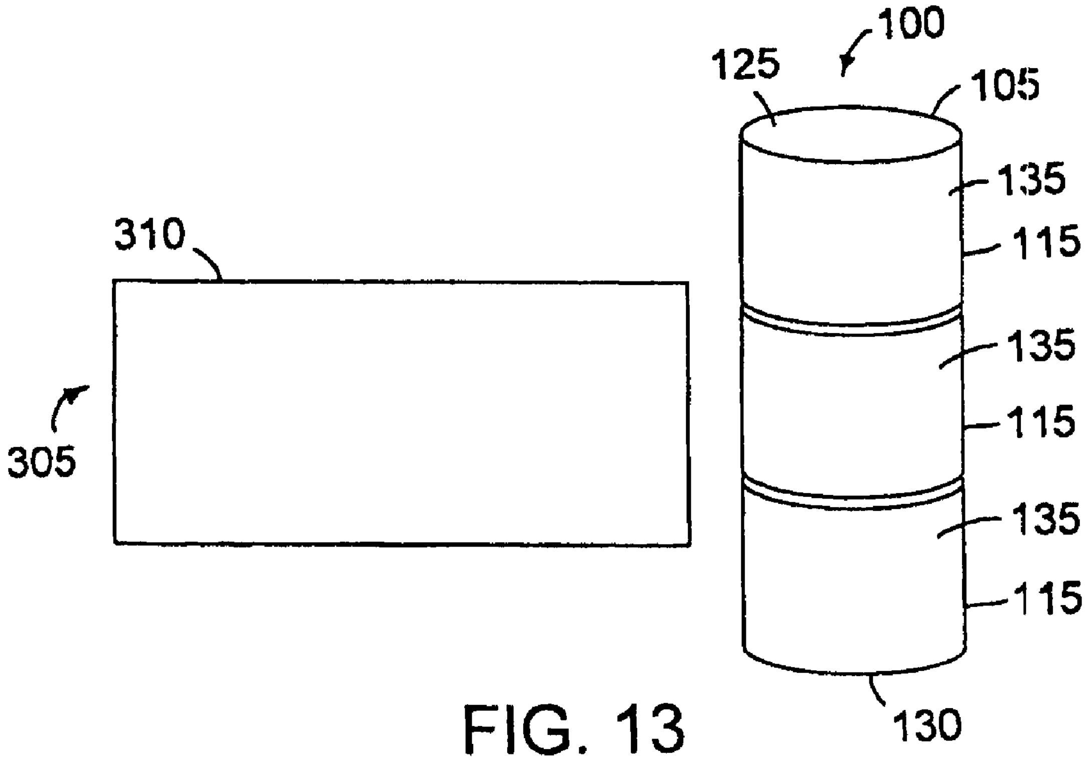
Figure 15:
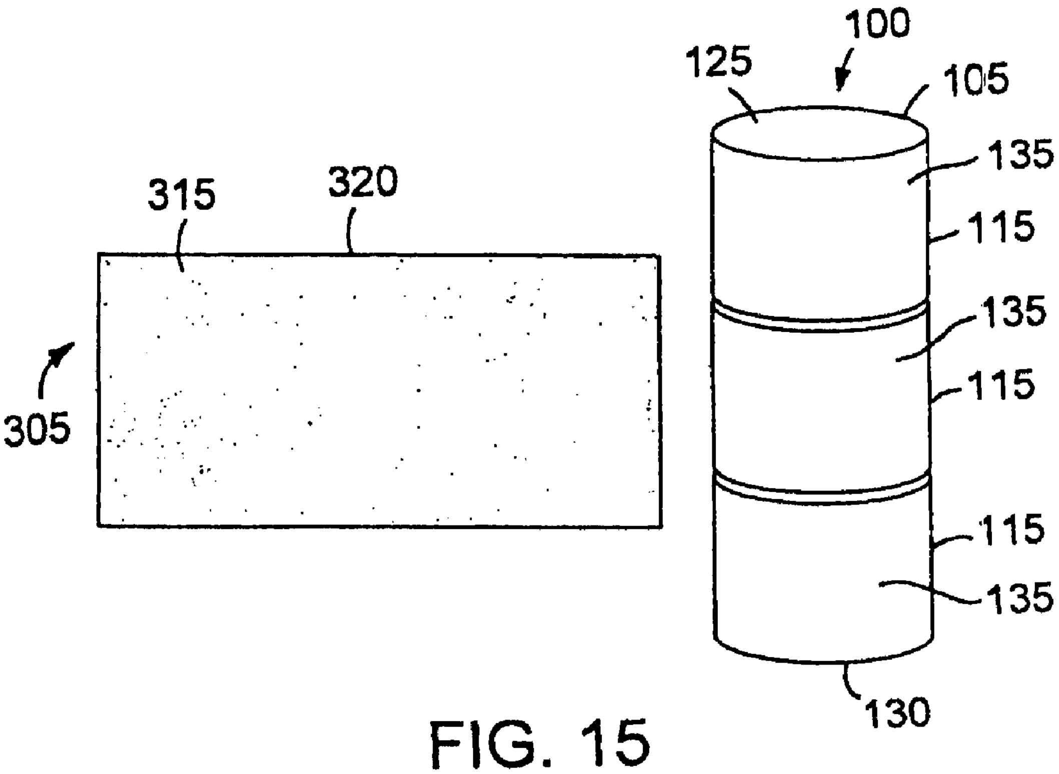

The reinforcing structure 305 is attached to the outer surface 135 of the stack 105, and may be attached to the outer surface of at least a portion of one or more elements 115. The reinforcing structure 305 also may be applied to the upper face 125 of the topmost element and/or may be applied to the lower face 130 of the bottommost element. The reinforcing structure typically is applied vertically (i.e., longitudinally) or circumferentially, or both, and may encase a portion of the upper face 125 of the topmost element and/or the lower face 130 of the bottommost element. Where there is more than one element, the reinforcing structure 305 typically is applied to the outer surface 135 of each element 115 of the bonded disk stack 105. However, as shown in FIGS. 11, 13, and 15, the reinforcing structure may be applied to a selected area of the outer surface 135 of the disk stack.

The reinforcing structure 305 may include at least one layer of a pre-impregnated fiber matrix 310. The fiber matrix may be any woven or interwoven fabric, sheet, tape or strip. The fiber matrix may take other forms, such as, for example, a collection of fiber segments. The fiber matrix may encompass any form factor, and may be narrow or wide as needed to selectively reinforce the bonded disk stack or monolithic element. The fiber matrix typically has a pre-formed woven or interwoven pattern. The fiber matrix is pre-impregnated with resin, and is applied to the electrical elements as desired. The pre-impregnated fiber matrix 310 is pre-formed and typically has fibers oriented in a set orientation. Implementations include fibers oriented to be parallel, perpendicular or at any other angle with respect to an axis of the stack 105. Another implementation includes fibers that are randomly oriented. The length of the fibers in the pre-impregnated fiber matrix 310 may be predetermined or random. Implementations include fibers that are, for example, continuous, of at least one predetermined length, or random in length. The fiber matrix 310 typically is pre-impregnated with resin. The matrix may be, for example, dipped, cast, powder cast, or otherwise pre-impregnated. The fibers may be any insulating fibrous material such as, for example, fiberglass, Kevlar, or Nextel.

Figure 7:
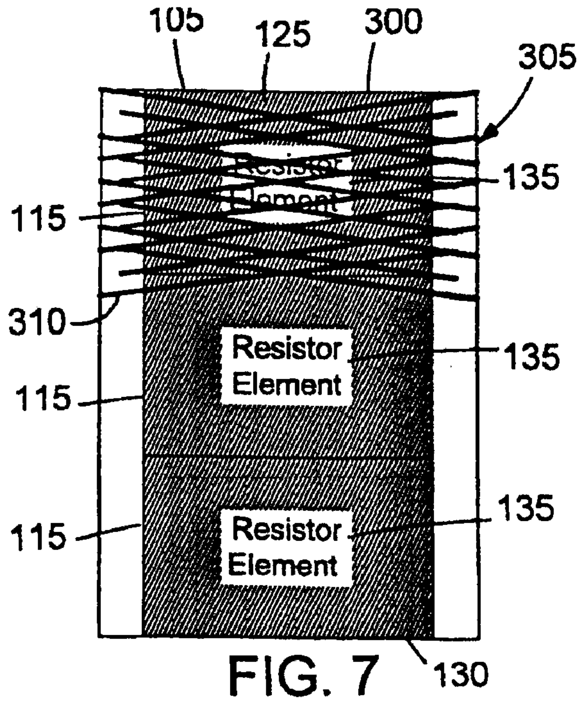
FIGS. 7-9 are cross-sectional views of reinforcing structures used with the bonded disk stack module of FIGS. 1-3.

As shown in FIG. 7, the reinforcing structure 305 may include a circumferentially-applied, pre-impregnated fiber matrix 310. The matrix 310 is made with a predetermined woven or interwoven pattern with fibers oriented at a predetermined angle. However, the matrix may also take other forms, such as, for example, a collection of fiber segments. The pattern may be, for example, a back and forth wind pattern, a circular wind pattern, or any other woven or interwoven pattern. The fiber matrix 310 may be applied to the electrical element in one or more layers that may result in a reinforcing structure having a predetermined thickness, such as, for example, approximately up to one-quarter of an inch, and more typically approximately twenty thousandths of an inch. The predetermined angle of the fibers typically is a shallow angle, but may include other angles. The angle may be, for example, between approximately 3 degrees and approximately 10 degrees. The pre-impregnated matrix 310 is typically applied to cover at least a portion of the outer surface 135 of at least one disk 115 in the stack 105. The matrix 310 also may cover or enclose at least a portion of the upper face 125 of the topmost element and/or at least a portion of the lower face 130 of the bottommost element of the stack 105. The circumferentially-applied matrix may also be applied vertically or may be combined with, for example, the vertically-applied matrix and/or the fiber segments embedded in epoxy described below.

Figure 8:
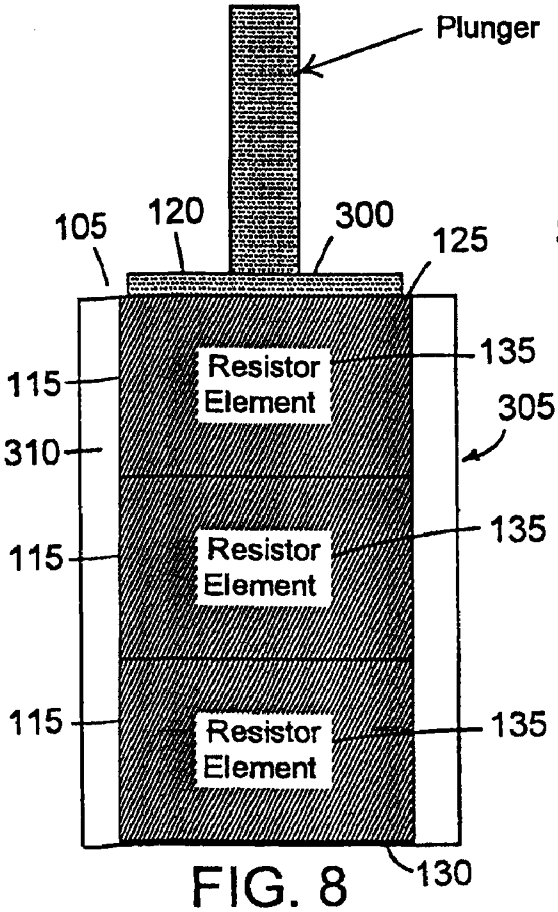
Figure 9:
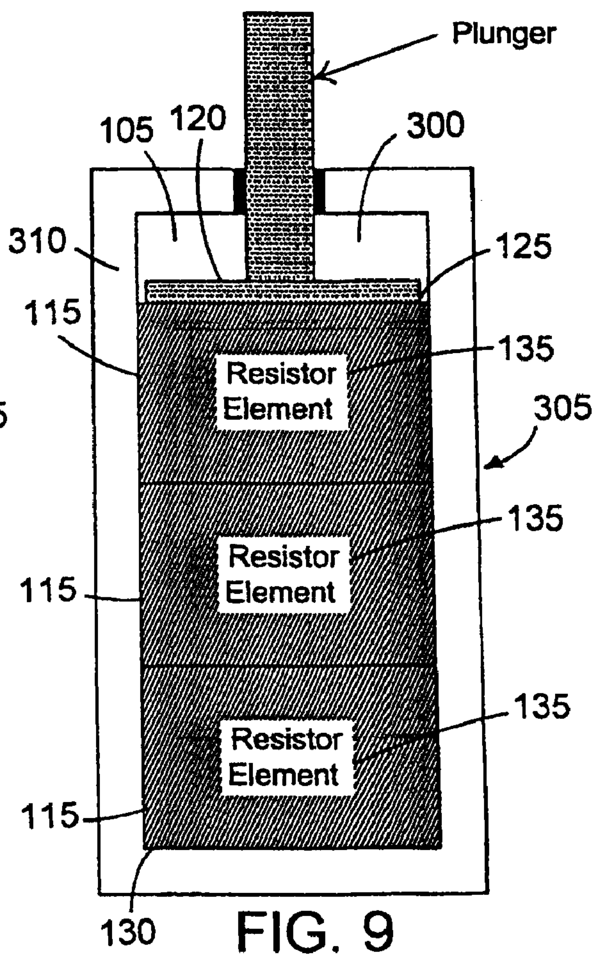

Referring to FIGS. 8 and 9, the reinforcing structure 305 may include a vertically-applied, pre-impregnated fiber matrix 310. The matrix 310 may be placed in a vertical orientation along an axis of the bonded disk stack 105. The vertical application may include a pre-impregnated fiber matrix 310 applied in one or more layers to a predetermined thickness of, for example, up to one-quarter of an inch, and more typically approximately twenty thousandths of an inch. The vertical application typically covers at least a portion of the outer surface 135 of at least one disk 115 in the stack 105. As shown in FIG. 9, the vertical application also may cover or enclose at least a portion of the upper face 125 of the topmost element and/or at least a portion of the lower face 130 of the bottommost element of the stack 105. The vertically-applied matrix may also be applied circumferentially or may be combined with other patterns, such as, for example, the circumferentially-applied matrix described above and/or the fiber segments embedded in epoxy described below.

Figure 10:
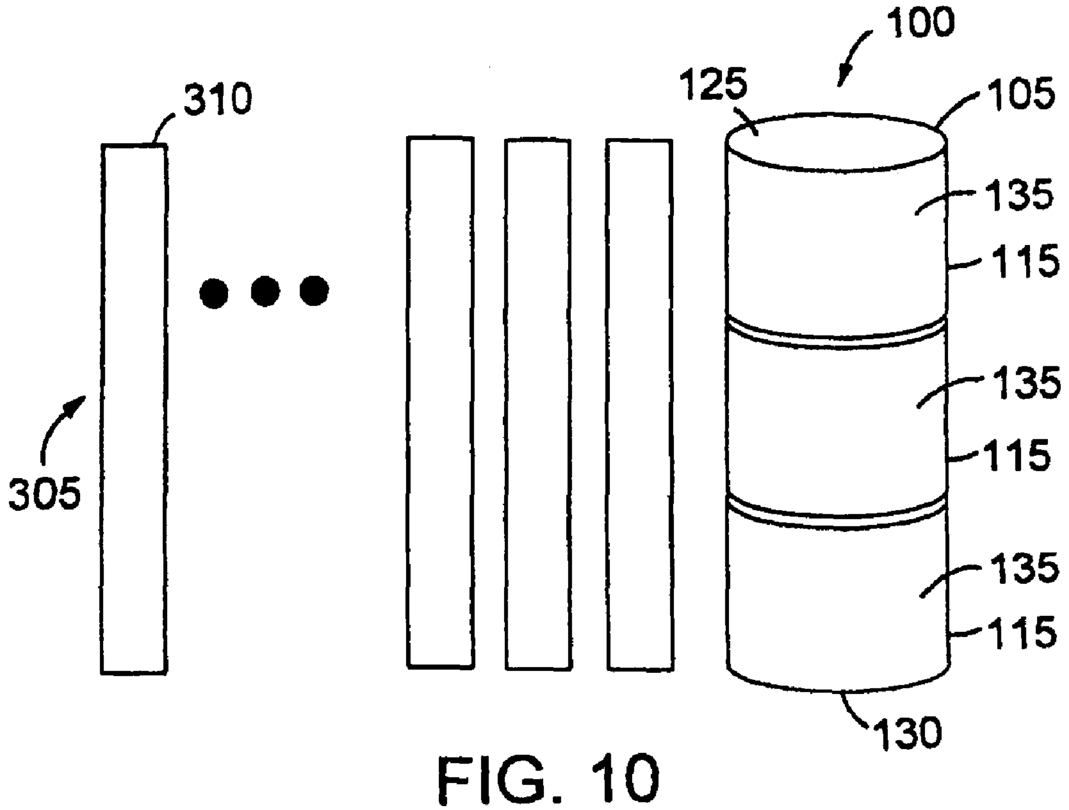
FIGS. 10-15 are plan views of reinforcing structures applied to the bonded disk stack module of FIG. 1.

Referring to FIGS. 10 and 11, the reinforcing structure 305 may include one or more vertically-applied pieces of pre-impregnated fiber matrix 310. A predetermined number of pieces of pre-impregnated fiber matrix 310 may be attached to at least a portion of the outer surface 135 of at least one disk 115. The pieces of pre-impregnated fiber matrix 310 are vertically oriented along an axis of the stack 105. The reinforcing structure 305 may reinforce the entire length of the stack 105 or may reinforce only a selected portion of the stack and/or a selected portion or all of the outer surface 135 of the stack 105.

Figure 12:
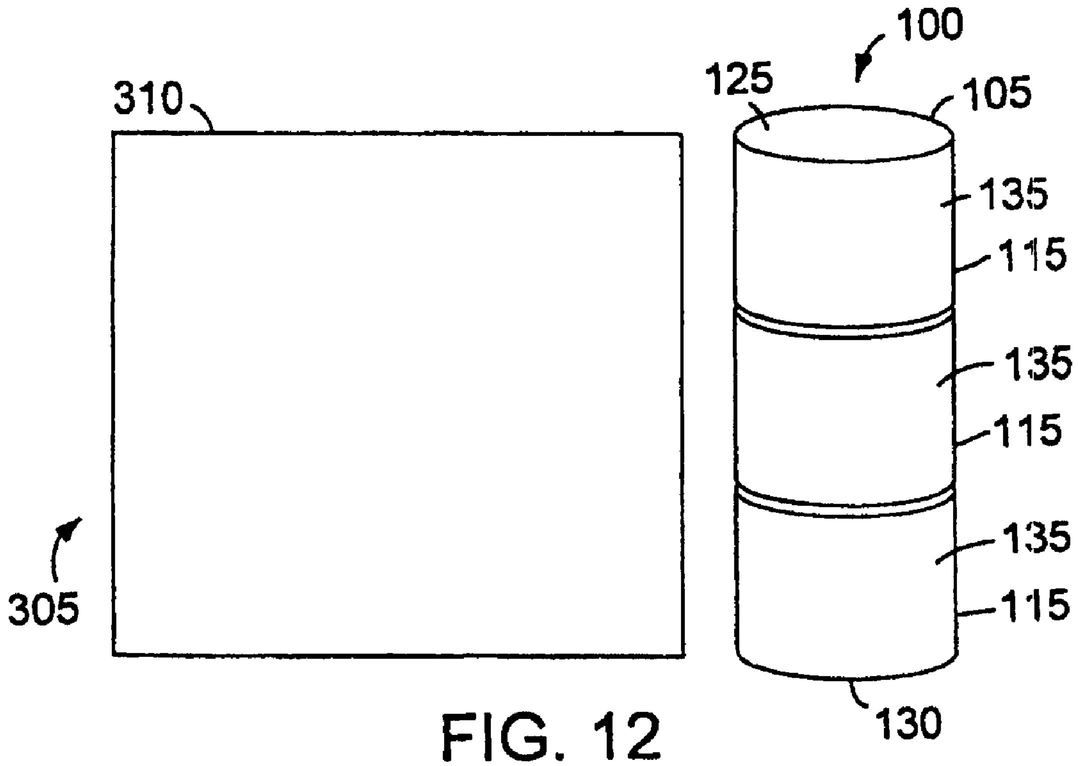

Referring to FIGS. 12 and 13, the reinforcing structure 305 may include a single piece of pre-impregnated fiber matrix 310. The piece of pre-impregnated fiber matrix 310 is vertically oriented along an axis of the bonded disk stack 105, and is sufficiently wide to cover all or the majority of the outer surface 135 of the stack 105. The reinforcing structure 305 may reinforce a selected portion or the entire length of the stack 105 and/or a selected portion or all of the outer surface 135 of the stack 105.

Figure 14:
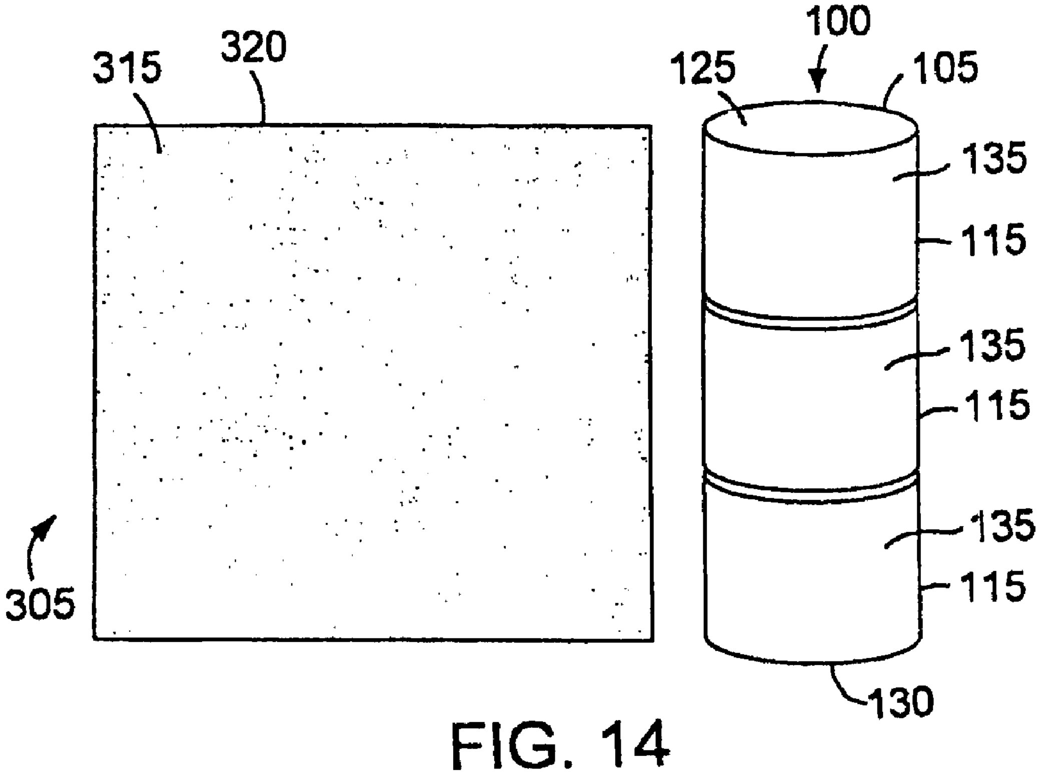

Referring to FIGS. 14 and 15, the reinforcing structure 305 may include a mixture of fiber segments 315 embedded in a resin 320. The fiber segments may all be of a uniform length or may include fibers of varying lengths. The orientation of the fiber segments may be a predetermined orientation or a random orientation. The stack 105 then is at least partially coated with the mixture. Any coating technique may be used to coat the stack 105 with the mixture such as, for example, dipping or powder coating. The reinforcing structure 305 may reinforce the entire length of the stack 105 or may reinforce only a selected portion of the stack and/or a selected portion or all of the outer surface 135 of the stack 105.

The reinforcing structure 305 increases the resistance of the stack 105 to impulse cracking. In this manner, the length or thickness of the stack can be increased without a subsequent increase in the risk of cracking during an impulse. The stack also can be left at a conventional length so as to provide a decreased likelihood that the stack will crack as compared to a non-reinforced stack of the same dimensions. To minimize the cost of reinforcement, the reinforcing structure can be placed only in those areas where the crack is likely to occur, which typically is in the area around and including the center of the stack along its length.

Referring to FIGS. 16-24, a reinforced electrical component module 400 of a surge arrester includes the monolithic MOV 205 and a reinforcing structure 405. The reinforced electrical component module 400 may be incorporated in the surge arrester 210 within the polymeric or ceramic housing 165, as shown in FIG. 5 and described above. The reinforced electrical component module 400 is a monolithic disk stack 205 and may be, for example, an MOV disk. Although the monolithic disk stack 205 has sufficient mechanical strength to withstand a static load during normal operation, cracking can occur during the thermo-mechanical shock sustained during high current impulses. The cracking tends to occur at the center of the monolithic disk because the maximum force tends to occur there. The tendency of a long monolithic MOV to crack in the middle during a high current impulse limits the length of the MOV, which increases the cost of surge arresters with high impulse ratings and/or limits the applicability of monolithic MOVs in surge arresters.

The reinforcing structure 405 is used to provide mechanical reinforcement to the electrical component module 205 in order to withstand the thermo-mechanical shock of a high current impulse, and may provide mechanical reinforcement to the entire reinforced electrical component module 400 or to a selected portion of the reinforced electrical component module 400. The reinforcing structure 405 typically provides axial and/or circumferential constraining forces around the reinforced electrical component module 400. The constraining forces provided by the reinforcing structure 405 are sufficient to allow the reinforced electrical component module 400 to withstand the thermo-mechanical shock of a high current impulse without cracking.

The reinforcing structure 405 is attached to at least a portion of the outer surface 235 of the monolithic MOV 205. The reinforcing structure 405 also may be applied to the upper face 225 of the MOV 205 and/or may be applied to the lower face 230 of the MOV 205.

The reinforcing structure 405 may include at least one layer of pre-impregnated fiber matrix 410. The pre-impregnated fiber matrix 410 typically has fibers oriented in a predetermined orientation. Implementations include fibers oriented to be parallel, perpendicular, or at any other angle with respect to an axis of the MOV 205. Another implementation includes fibers that are randomly oriented. The length of the fibers in the pre-impregnated fiber matrix 410 may be predetermined or random. Implementations include fibers that are, for example, continuous, of at least one predetermined length, or random in length. The fiber matrix 410 typically is pre-impregnated with resin. The fiber matrix may be, for example, dipped, cast, powder cast, or otherwise pre-impregnated. The fibers may be made of any insulating fibrous material. For example, the fibers may be made of fiberglass, Kevlar, or Nextel.

Figure 16:
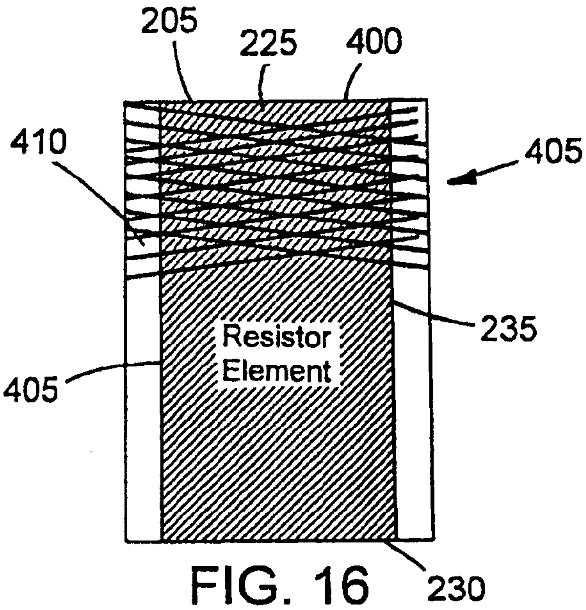
FIGS. 16-18 are cross-sectional views of reinforcing structures used with the monolithic electrical component module of FIGS. 4-6.

As shown in FIG. 16, the reinforcing structure 405 may include a circumferentially-applied, pre-impregnated fiber matrix 410. The matrix 410 is made with a predetermined woven or interwoven pattern with fibers oriented at a predetermined angle. The pattern may be, for example, a back and forth wind pattern, a circular wind pattern, or any other woven or interwoven pattern. The fiber matrix may be applied to the electrical element in one or more layers to a predetermined thickness, such as, for example, approximately up to one-quarter of an inch, and more typically approximately twenty thousandths of an inch. The predetermined angle of the fibers typically is a shallow angle, but may include other angles. The angle may be, for example, between approximately 2 degrees and approximately 45 degrees, and more particularly, between approximately 3 degrees and approximately 10 degrees. The pre-impregnated fiber matrix typically is applied to cover at least a portion of the outer surface 235 of the monolithic stack 205. The fiber matrix also may cover or enclose at least a portion of the upper face 225 and/or at least a portion of the lower face 230 of the monolithic stack 205. The circumferentially applied fiber matrix may be applied vertically or may be combined with, for example, the vertically applied matrix or the fiber segments embedded in epoxy described below.

Figure 17:
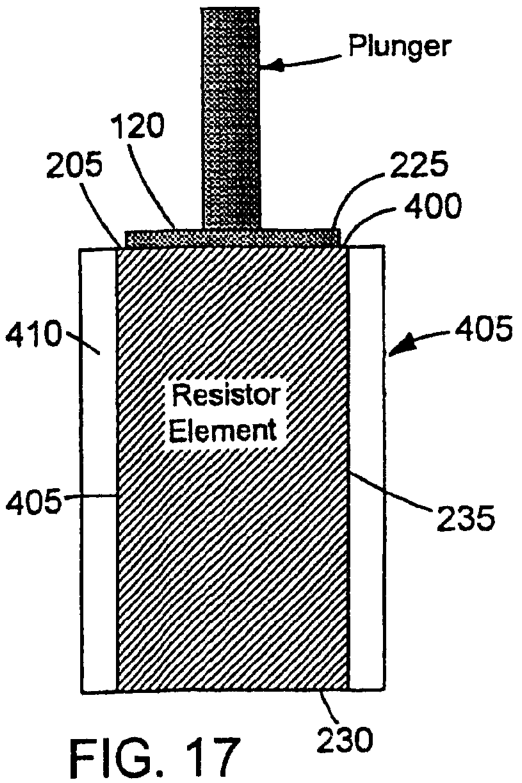
Figure 18:
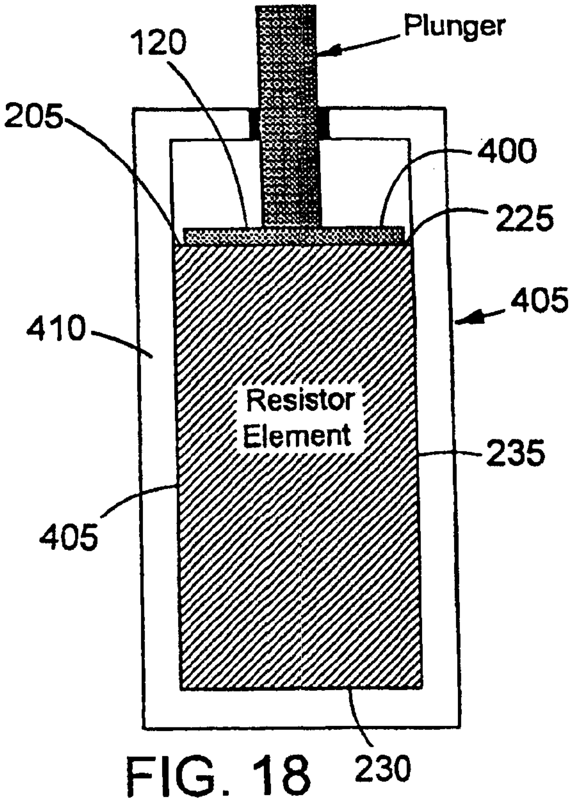

Referring to FIGS. 17 and 18, the reinforcing structure 405 may include a vertically-applied, pre-impregnated fiber matrix 410. The matrix 410 may be placed in a vertical orientation along an axis of the monolithic MOV 205. The vertical application may include at least one piece of fiber matrix 410 that may be arranged in one or more layers to a predetermined thickness of, for example, up to one-quarter of an inch, and more typically approximately twenty thousandths of an inch. The vertical application typically covers at least a portion of the outer surface 235 of the monolithic MOV 205. The vertical application also may cover or enclose at least a portion of the upper face 225 and/or at least a portion of the lower face 230 of the monolithic MOV 205. The vertical application pattern may be applied circumferentially or may be combined with, for example, the circumferentially-applied matrix described above or the fiber segments embedded in epoxy described below.

Figure 19:
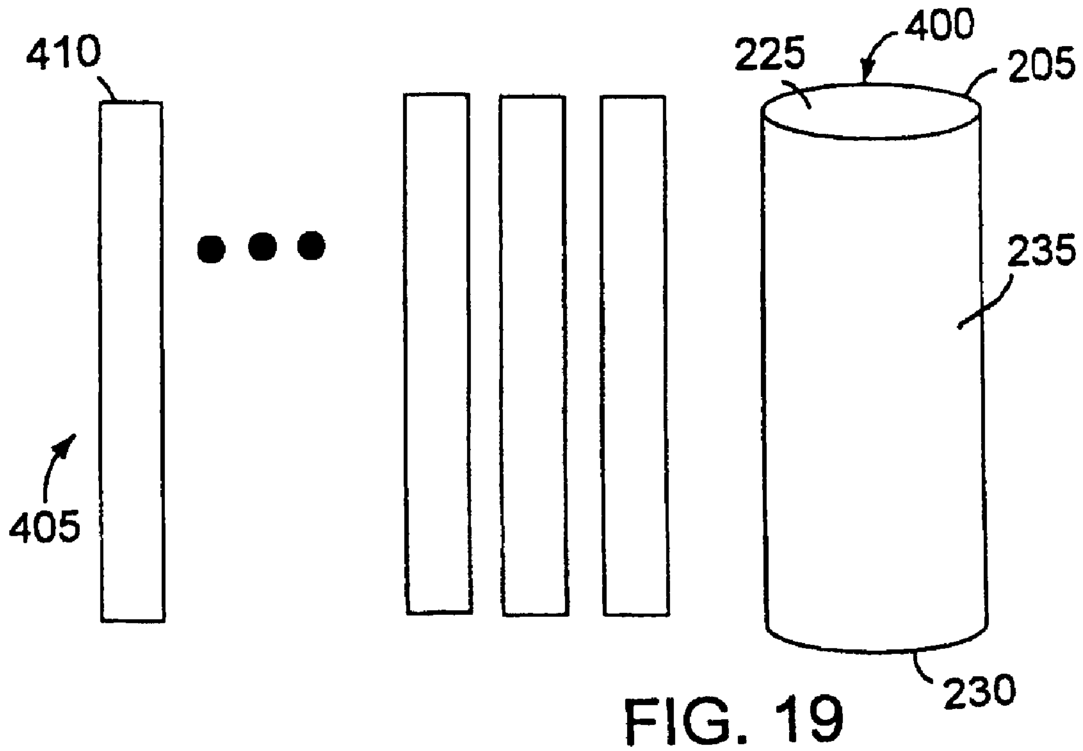
FIGS. 19-24 are plan views of reinforcing structures applied to the monolithic electrical component module of FIG. 4.
Figure 20:
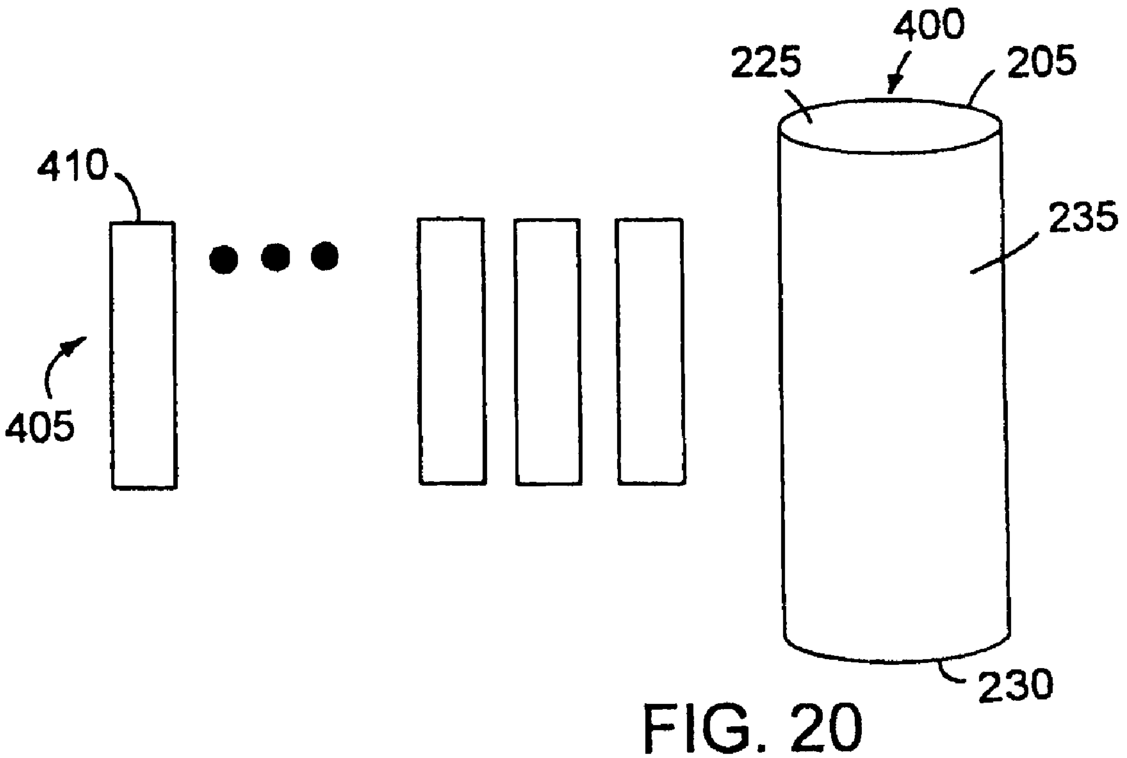

Referring to FIGS. 19 and 20, the reinforcing structure 405 may include one or more vertically-applied pieces of pre-impregnated fiber matrix 410. A predetermined number of pieces of pre-impregnated fiber matrix 410 may be attached to at least a portion of the outer surface 235 of the monolithic stack 205. The pieces of pre-impregnated fiber matrix 410 are vertically oriented along an axis of the stack 205. The reinforcing structure 405 may reinforce the entire length of the stack 205 or may reinforce only a selected portion of the stack and/or a selected portion or all of the outer surface 135 of the stack 105.

Figure 21:
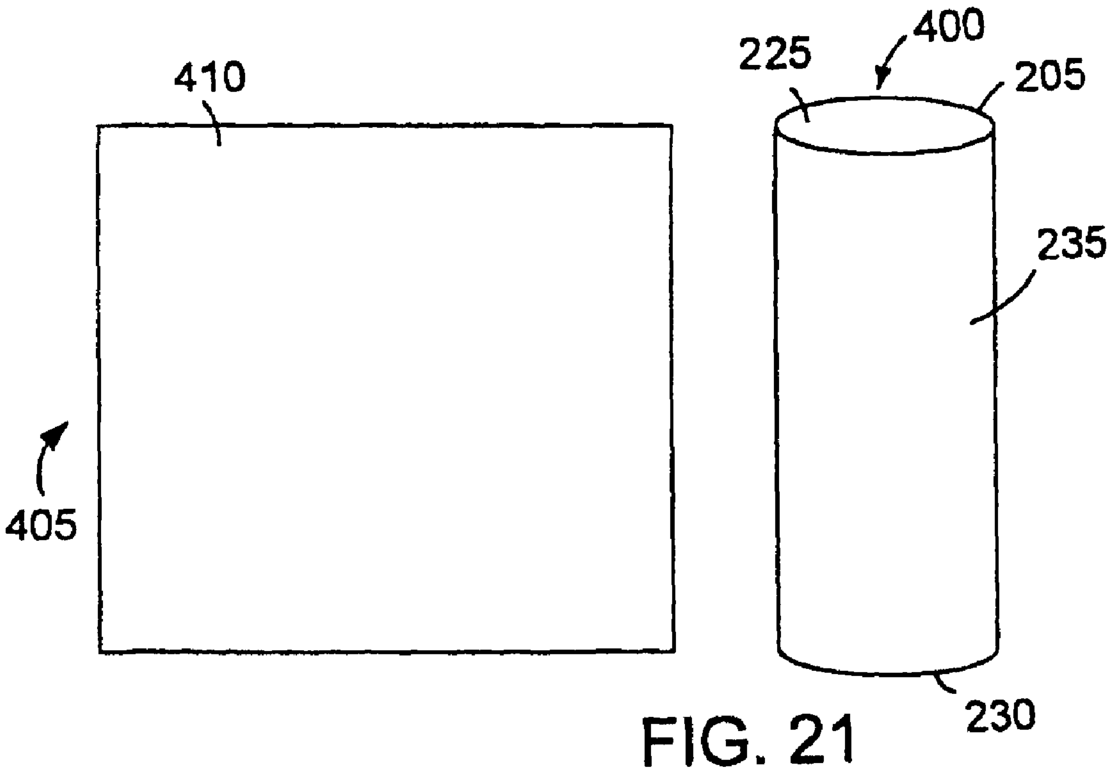
Figure 22:
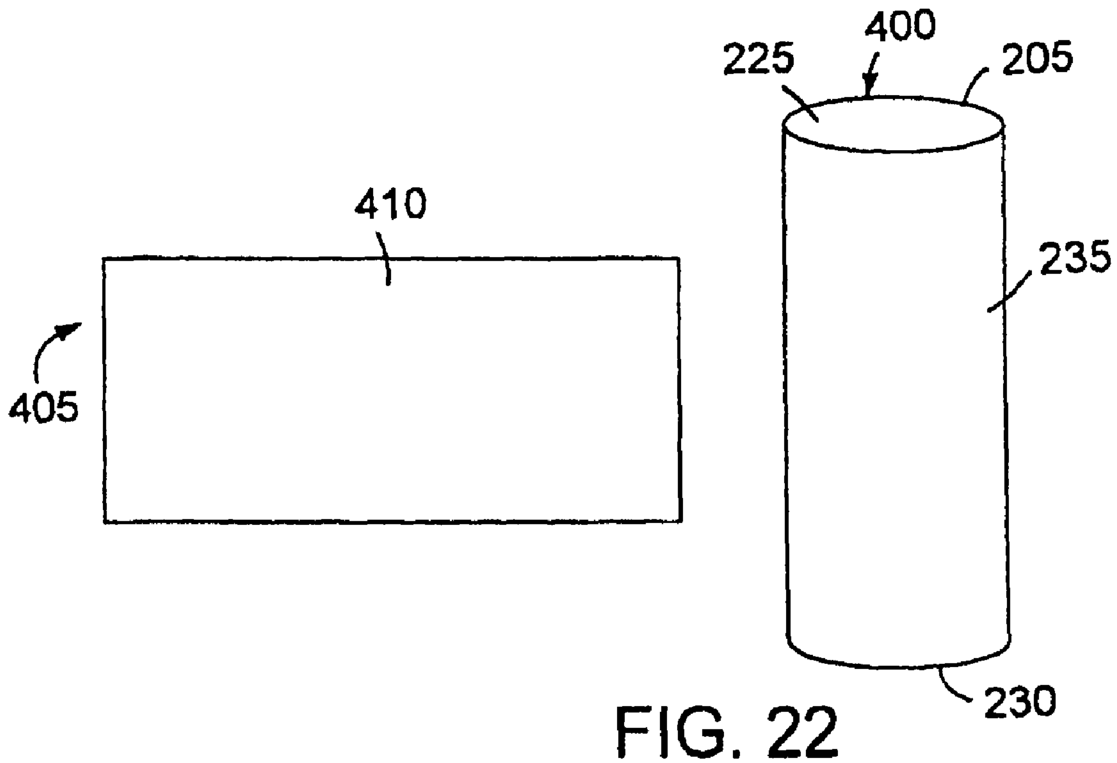

Referring to FIGS. 21 and 22, the reinforcing structure 405 may include only a single piece of pre-impregnated fiber matrix 410. The piece of pre-impregnated fiber matrix 410 is vertically oriented along an axis of the stack 205, and is sufficiently wide to cover all or the majority of the outer surface 235 of the stack 205. The reinforcing structure 405 may reinforce the entire length of the stack 205 or may reinforce only a selected portion of the stack and/or a selected portion or all of the outer surface 135 of the stack 105.

Figure 23:
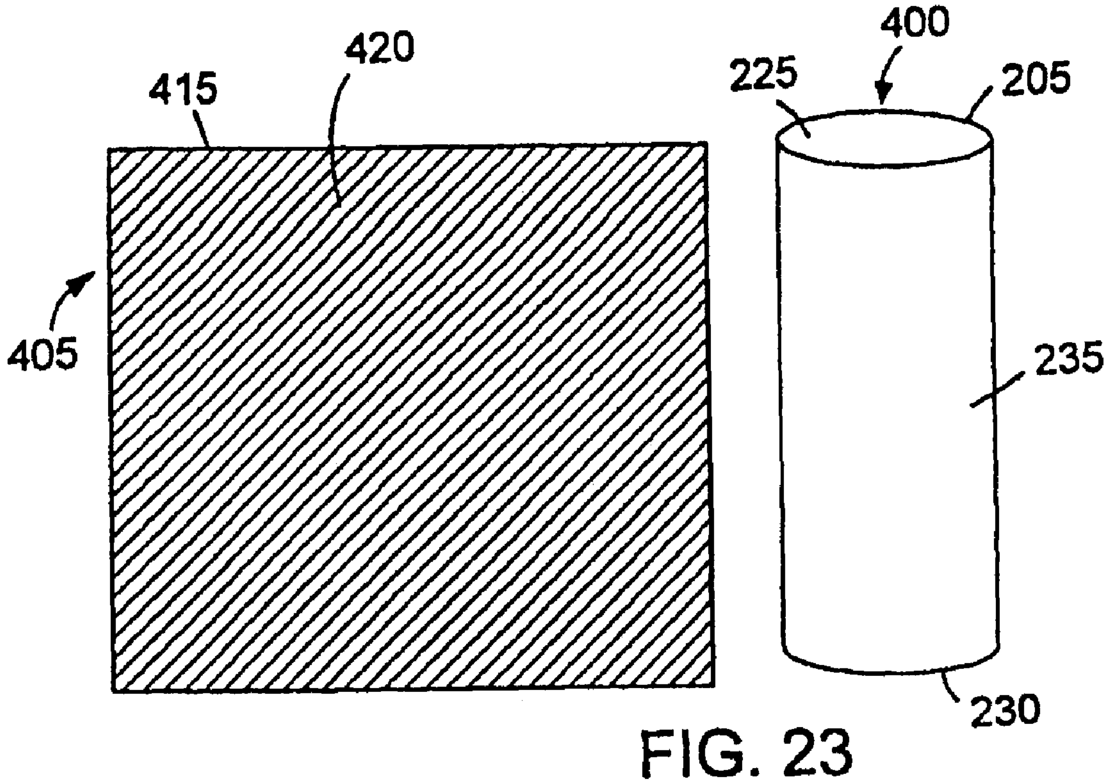
Figure 24:
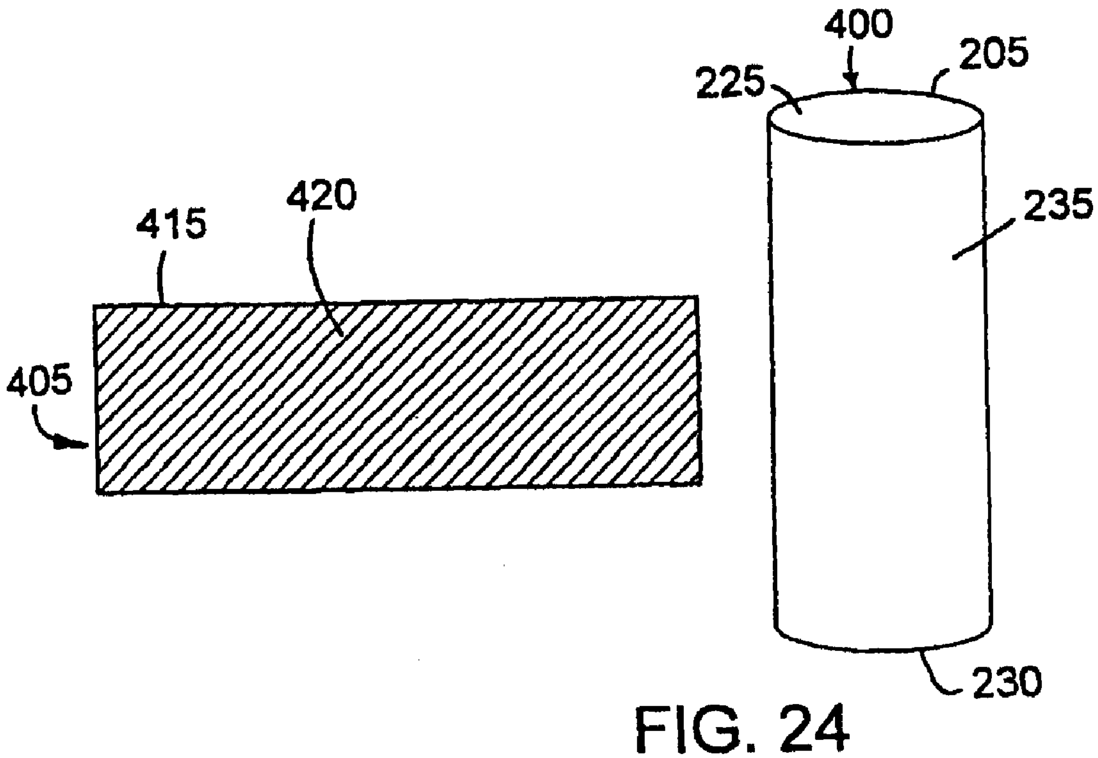

Referring to FIGS. 23 and 24, the reinforcing structure 405 may include a mixture of fiber segments 415 embedded in a resin matrix 420, with the mixture at least partially coating the stack 205. The fiber segments may all be of a uniform length or may include fiber segments of varying lengths. The orientation of the fiber segments may be a predetermined orientation or a random orientation. Any coating technique may be used to coat the stack 205 with the mixture such as, for example, dipping or powder coating. The reinforcing structure 405 may reinforce the entire length of the stack 205 or may reinforce only a selected portion of the stack and/or a selected portion or all of the outer surface 135 of the stack 105.

The reinforcing structure 405 increases the resistance of the monolithic MOV 205 to impulse cracking. In this manner, the length or thickness of the MOV can be increased without a subsequent increase in the risk of cracking during an impulse. The MOV also can be left at a conventional length so as to have a decreased likelihood of cracking relative to a non-reinforced monolithic MOV of the same dimensions. To minimize the cost of reinforcement, the reinforcing structure can be placed only in those areas where the crack is likely to occur, typically in the area around and including the center of the MOV along its length. As a result, increased-length monolithic MOVs can be produced that are longer than those currently used in surge arresters. Also, the use of bonded disk stacks becomes practical. Thus, this use will increase the applicability of monolithic MOVs to bonded disk stack surge arresters as well as monolithic surge arresters.

Figure 25:
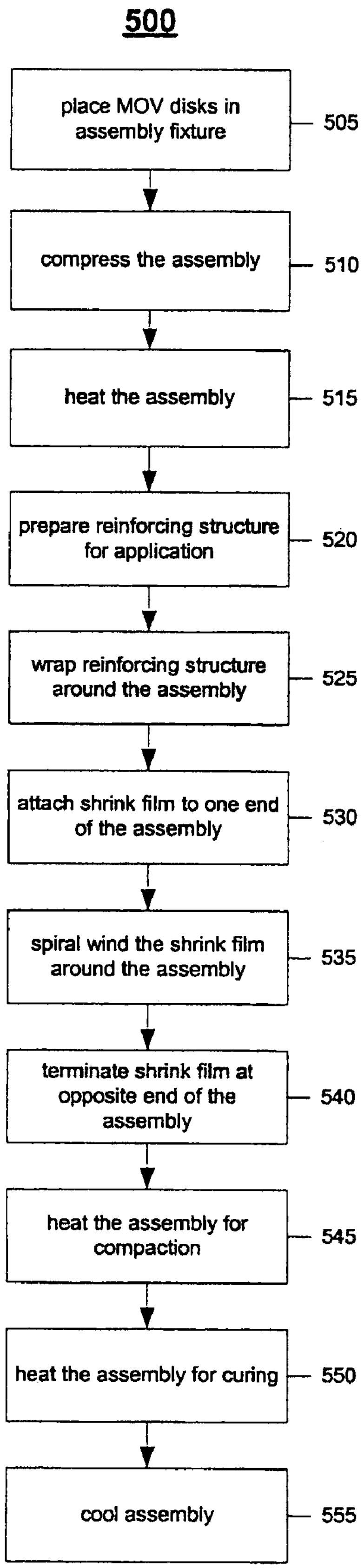
FIGS. 25, 30, and 31 are flow charts of a process for reinforcing an electrical element.
Figure 26:
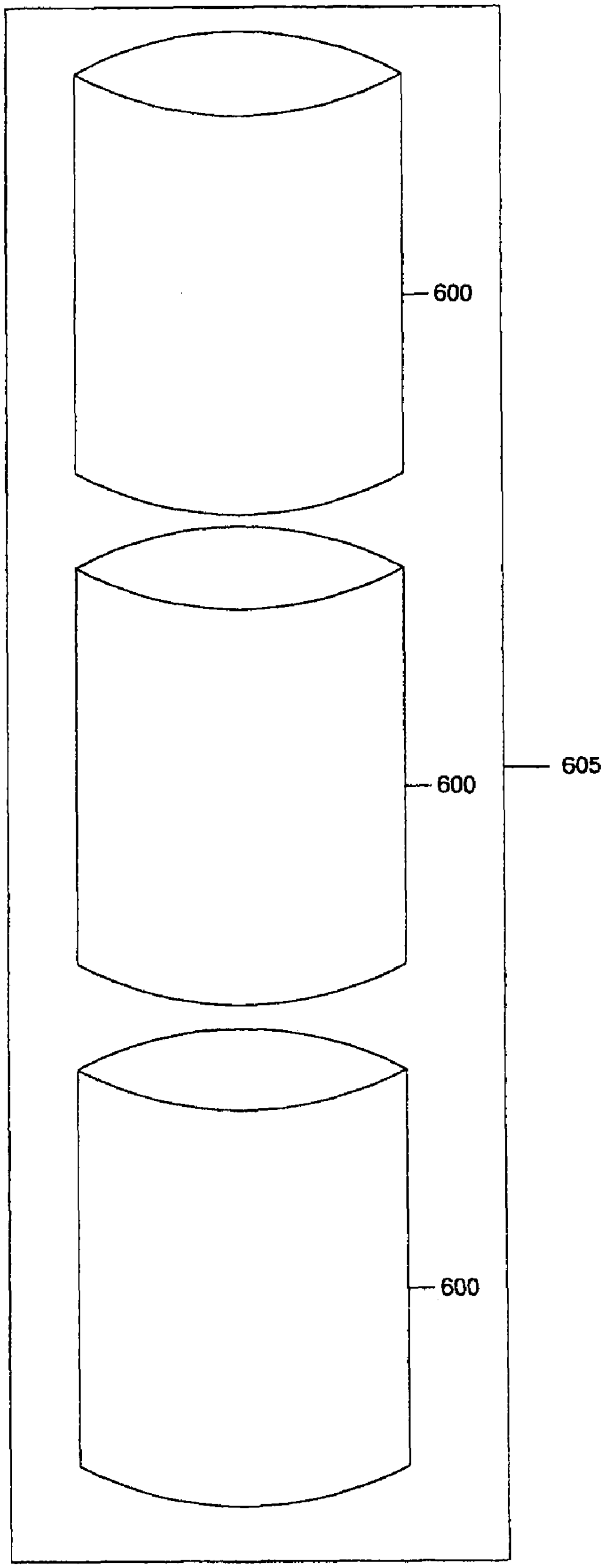
FIGS. 26-29 are block diagrams illustrating steps in the process of FIG. 25.

FIG. 25 shows a process 500 for manufacturing an electrical apparatus such as a surge arrester, and FIGS. 26-29 illustrate steps of the process 500. The surge arrester includes an electrical component module. While such a module may include, for example, a bonded or unbonded disk stack or a monolithic MOV, FIGS. 26-29 illustrate a disk stack. Initially, as shown in FIG. 26, MOV disks 600 are placed into an assembly fixture 605 to create a component module that includes the disks 600 (step 505).

Figure 27:
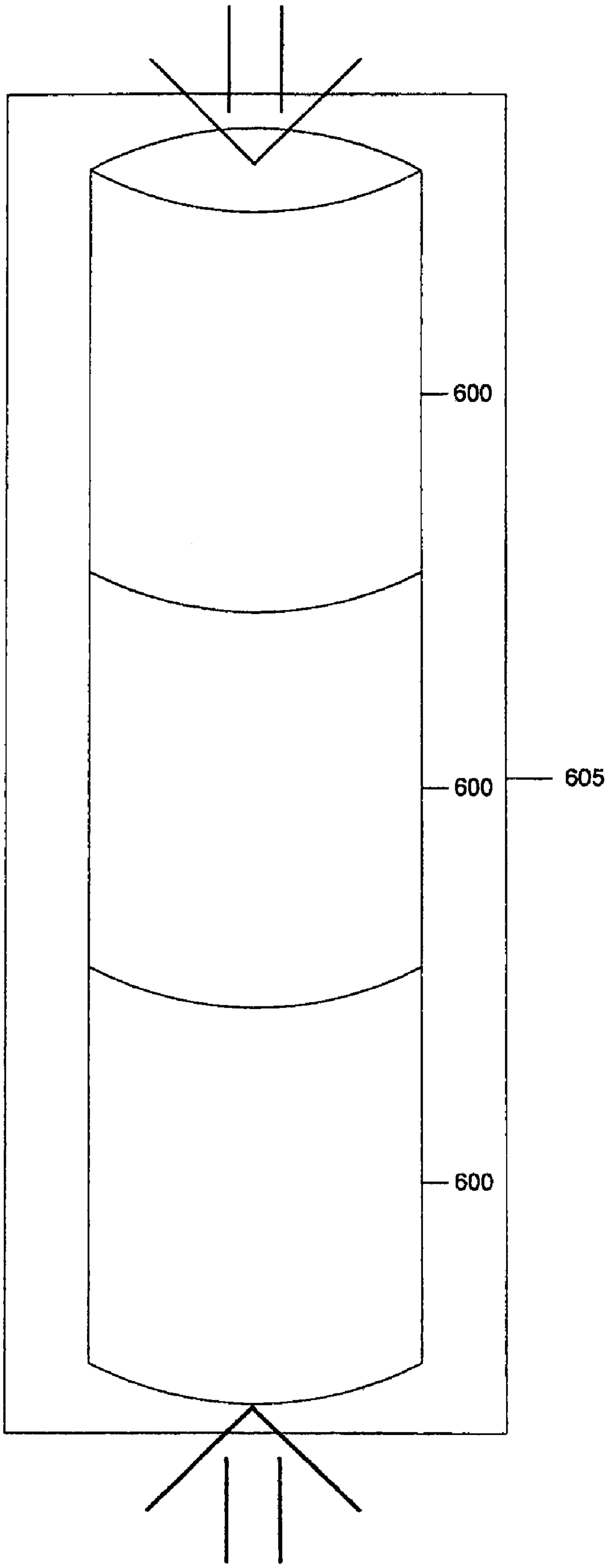

The MOV disks then are compressed, as shown in FIG. 27, by adding pressure to ends of the disks (step 510). In one implementation, the disks are compressed using pressure of 550 lbs.

The disks 600 then are heated (step 515). In one implementation, infrared heating elements are used to heat the disks 600 to a temperature of 49 degrees Celsius. In another implementation, an oven or a forced air heat gun may be used to heat the disks 600. In general, the disks 600 are heated to a temperature that is sufficient to cause resin in a pre-impregnated fiber matrix to become tacky or to melt. The temperature can be varied to adjust the tackiness, viscosity, or flowability of the resin as desired during the fabrication of the surge arrester.

A reinforcing structure 610 (FIG. 28), which includes at least one layer of pre-impregnated fiber matrix, is prepared for application to the disks 600 (step 520). For example, the fiber matrix may be embedded in an epoxy matrix, or the fibers of the matrix may be oriented in a predetermined or random direction. In other implementations, fiber segments may be mixed in an epoxy. The fibers may be of a predetermined length or of random lengths.

Figure 28:
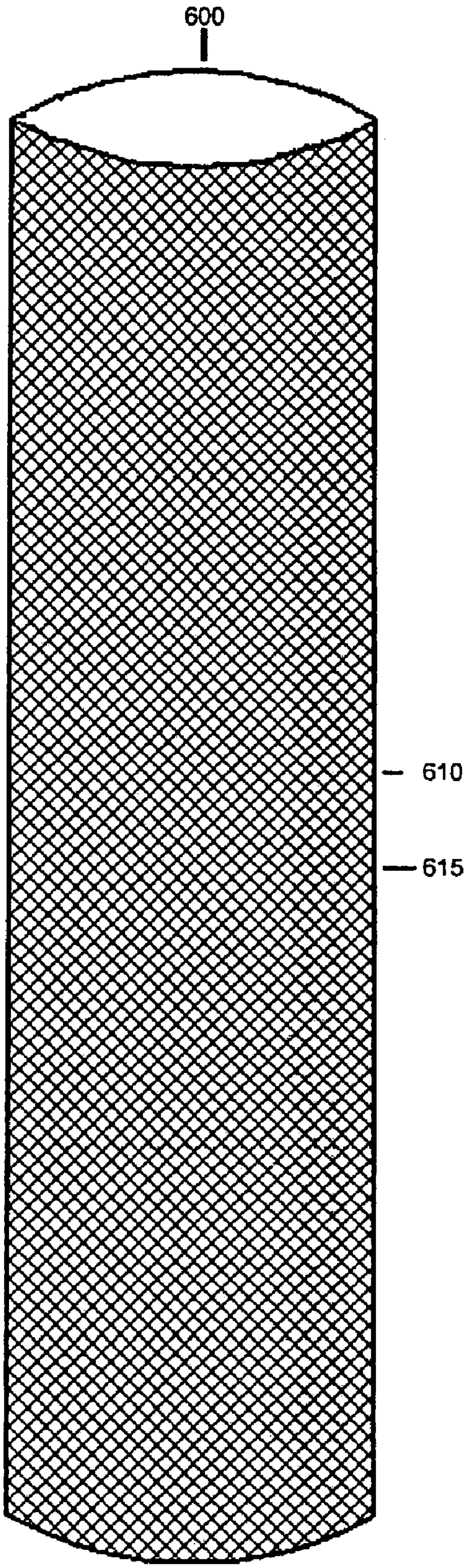

As shown in FIG. 28, the reinforcing structure 610 is applied to the disks 600 (step 525). For example, the reinforcing structure 610 may be applied to at least a portion of at least one disk. The reinforcing structure 610 may be applied by, for example, circumferentially and/or vertically applying pre-impregnated fiber matrix 615, as described above. In another implementation, the reinforcing structure 610 may be applied as a coating. For example, the reinforcing structure 610 may be applied as a coating of fiber segments mixed in resin, as described above. In general, enough wraps are applied to the assembly to achieve the desired mechanical properties. In one implementation, the required number of wraps of the reinforcing structure is between one and four.

Figure 29:
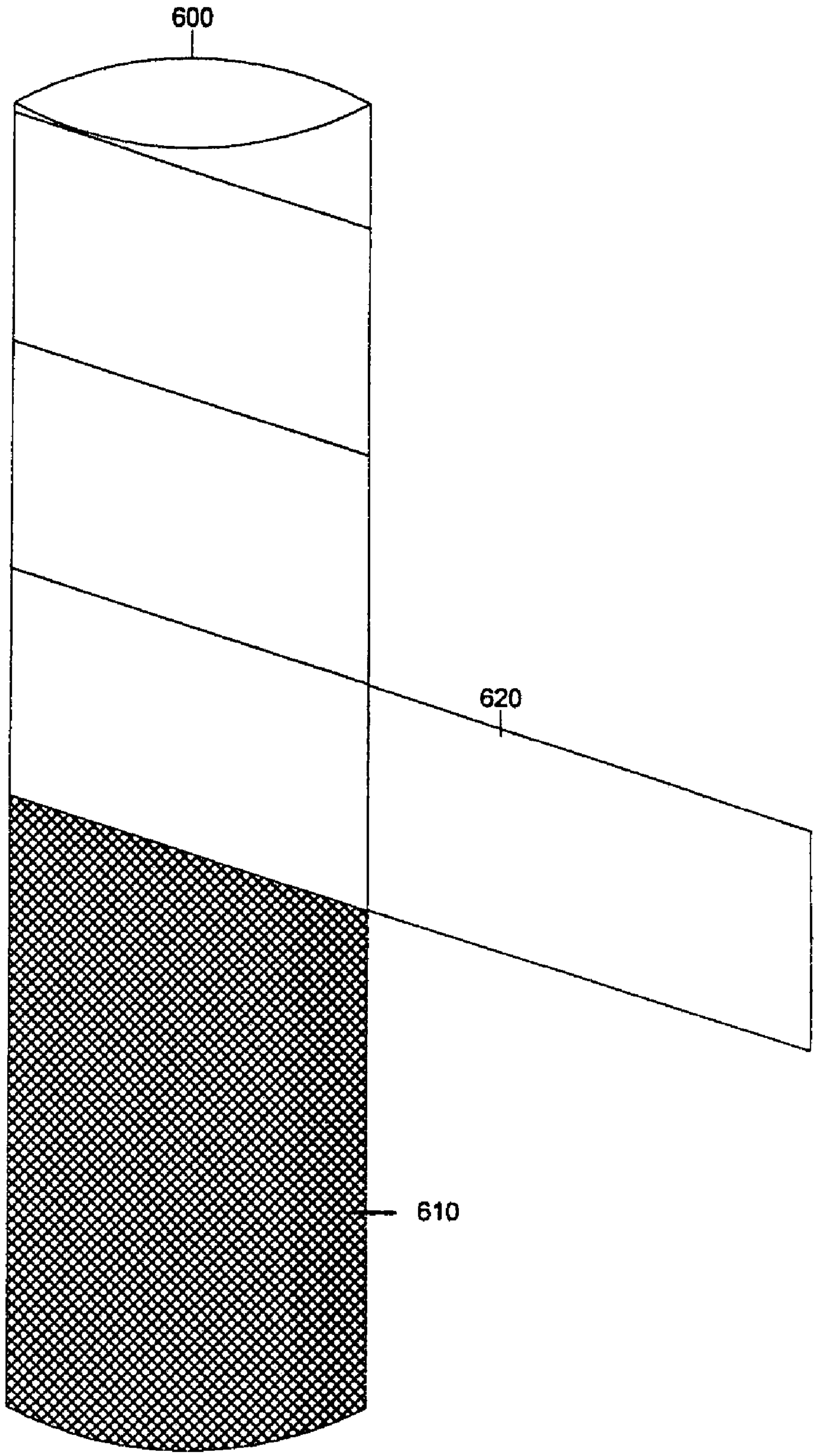

As shown in FIG. 29, shrink film 620 is then applied to the assembly of the disks 600 and the applied reinforcing structure 610 to aid in compacting the reinforcing structure 610. In one implementation, the shrink film 620 is a bi-axially oriented polypropylene film. The shrink film 620 is attached substantially at one end of the assembly (step 530). The shrink film 620 then is spiral wound around the assembly such that each winding of the shrink film 620, with the exception of the first winding, overlaps the previous winding (step 535). Overlap is provided through the length of the entire assembly to avoid the production of gaps between windings of the shrink film when the film shrinks. While the shrink film 620 is being wound around the assembly, a substantially constant tension is maintained on the shrink film 620. In one implementation, a tension of approximately 16 pounds is maintained as the shrink film 620 is wound around the assembly.

After the shrink film 620 has been wrapped around the entire length of the assembly, the shrink film 620 is attached at the opposite end of the assembly (step 540). In one implementation, the shrink film 620 is attached to both ends of the assembly with high temperature tape that is capable of holding the shrink film 620 to the assembly under high temperatures such as those to which the assembly is later exposed.

After the entire assembly has been wrapped with the shrink film 620, the assembly is heated to a first temperature range that makes the epoxy of the reinforcing structure 610 viscous and causes the shrink film 620 to shrink and compact the viscous reinforcing structure (step 545). In particular, the shrink film 620 applies a compressive force to the assembly when heated to a temperature below a melting temperature of the shrink film 620. In the above referenced implementation, the melting temperature of the shrink film 620 is 158 degrees Celsius. There is a range of temperatures below the melting temperature of the shrink film 620 within which the shrink film 620 applies a compressive force. As the temperature rises above the initial melting temperature, the shrink film 620 loses the ability to compact the assembly. When heated to or above a threshold temperature, the shrink film 620 ceases to apply a compressive force to the assembly. The first temperature range is chosen to be below the melting temperature of the shrink film 620 so that the shrink film 620 provides maximum compressive force to the assembly in order to eliminate any air within the reinforcing structure 610. In one implementation, the first temperature range is between approximately 135 and approximately 150 degrees Celsius, and the assembly is heated to the first temperature range for between 10 and 30 minutes.

Heating the assembly to the first temperature range enables the shrink film 620 to generate a high pressure on the assembly, which promotes thorough wetting by the resins of the fiberglass in the reinforcing structure. The increased tension in the shrink film 620 removes entrapped air without generating low resin viscosity that could drive resin between the stacked disks 600. In other words, within the first temperature range, the viscosity of the resin is such that the resin is prevented from flowing between disks 600 when the assembly is cured.

After the surge arrester module has been heated to the first temperature range (step 545), the surge arrester is heated to a second temperature that is higher than the first temperature range (step 550). The second heating phase cures the reinforcing structure 610. Because the temperature at which the assembly is heated during the second heating phase is greater than the threshold temperature of the shrink film 620, no compressive force is applied to the surge arrester module during the curing process. In one implementation, the second temperature is approximately 165 degrees Celsius, and the surge arrester module is heated at the second temperature for between 5 and 30 minutes.

Curing at the second temperature prevents the epoxy resin in the reinforcing structure 610 from being improperly driven into interfaces between the MOV disks included in the assembly since the second temperature is above the temperature at which the shrink film 620 may apply compressive forces to the assembly. Preventing resin from entering the interfaces between the MOV disks eliminates the need to bond the disks together and avoids use of a non-conductive epoxy between electrically conductive components of the assembly that would interfere with uniform electrical conduction through the assembly and increase manufacturing costs. Curing at the second temperature maximizes the glass transition temperature of the epoxy resin, which is essential for proper surge arrester performance. Curing at the second temperature also results in the most favorable mechanical, dielectric, and thermal properties of the assembly. After the assembly has been heated for curing (step 550), the assembly is allowed to cool (step 555).

In other implementations, the shrink film 620 may be replaced with tape that does not shrink when heated. The tape may be spiral wound around the assembly in the same way as the shrink film 620. In other words, a constant tension may be maintained on the tape as the tape is spiral wound around the assembly. The tension applied to the tape as the tape is spiral wound around the assembly may be sufficient to compact the reinforcing structure 610 as the assembly is heated to the first temperature range. As the assembly is heated to the first temperature range, the viscosity of the reinforcing structure 610 decreases, and the tension in the tape causes the reinforcing structure 510 to be compacted. The force applied to the assembly is not the result of shrinking in the tape, as is the case for the shrink film 620. Like the shrink film 620, the tape has a melting temperature above which the tape relaxes and the tension in the tape is lost. The second temperature at which the assembly is cured is chosen to be above the melting temperature for the tape. Using such a temperature has the same properties and advantages of choosing the second temperature to be above the melting temperature of the shrink film 620 when the shrink film 620 is used.

Figure 30:
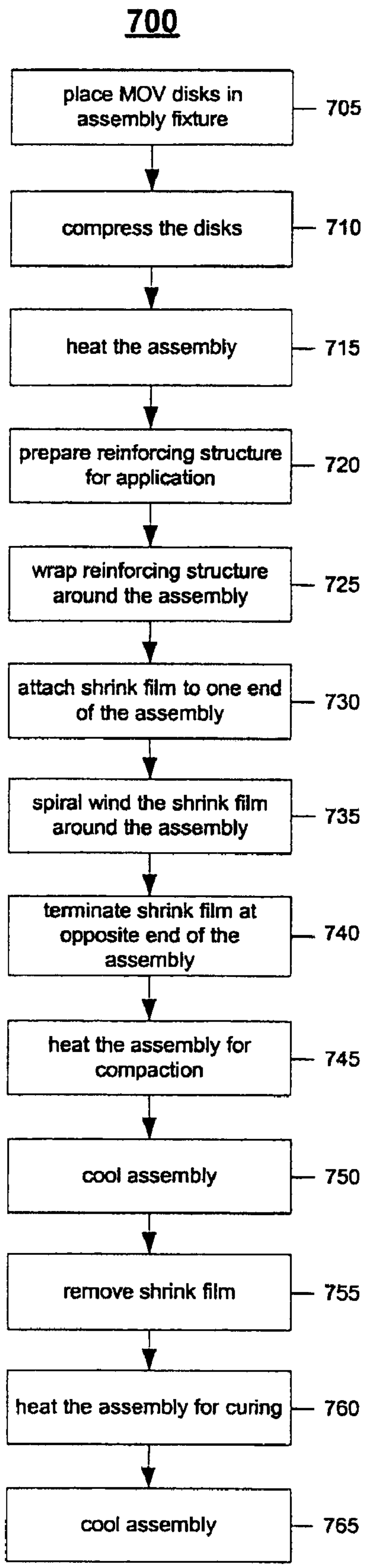

FIG. 30 is a flow chart of a process 700 that is an alternate implementation of the process 500 of FIG. 25. Steps 705-745 of the process 700 are the same as steps 505-545 of the process 500. However, after the assembly is heated for compaction (step 745), the assembly is allowed to cool (step 750). After the assembly is sufficiently cool, the shrink film is removed from the assembly (step 755). Removing the shrink film includes removing the high temperature tape from one of the ends of the assembly and unwinding the tape from the length of the assembly. After the shrink film is unwound, the high temperature tape is removed from the opposite end of the assembly, thus fully removing the shrink film from the assembly.

The assembly without shrink film is then heated in order to cure the assembly (step 760). Because the shrink film has been removed, there is no compressive force that will drive the epoxy resin in the reinforcing structure between the MOV disks of the assembly. Therefore, the shrink film need not be considered when choosing a temperature at which to cure the assembly. Rather, a curing temperature is chosen in order to achieve the most favorable mechanical, dielectric, and thermal properties of the assembly and to ensure proper surge arrester performance.

After the assembly has been cured (step 760), the assembly is allowed to cool (step 765). The cooled assembly is ready for placement in a surge arrester or other uses.

Figure 31:
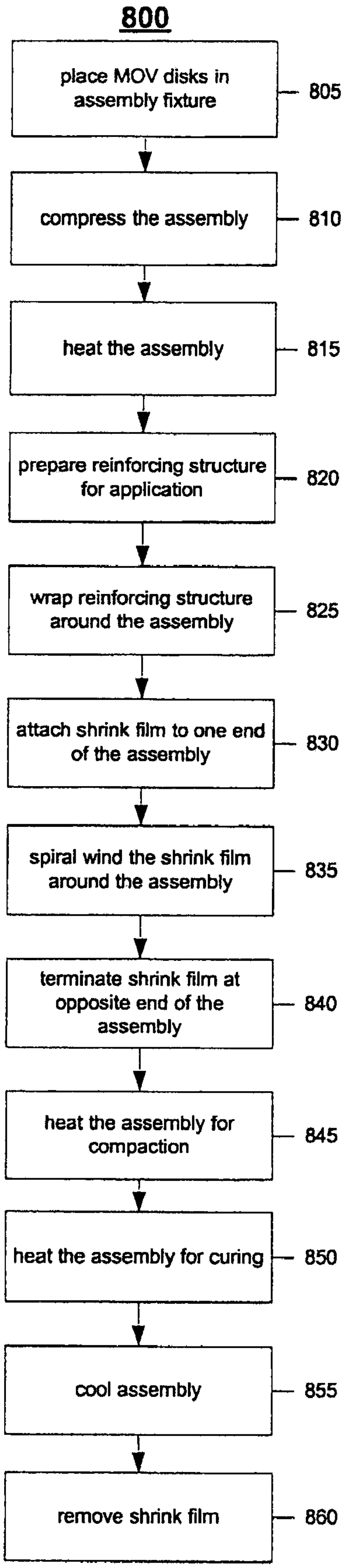

FIG. 31 is a flow chart of a process 800 that is an alternate implementation of the processes 500 and 700. Steps 805-845 of the process 800 are the same as steps 505-545 of the process 500 and as steps 705-745 of the process 700. Like the process 500, after the assembly is heated for compaction (step 845), the assembly is cured with the shrink film still applied (step 850). Therefore, the temperature at which the assembly is cured is chosen such that the shrink film does not apply a compressive force to the assembly to drive the epoxy resin between the MOV disks.

The assembly then is allowed to cool (step 855). After the assembly is sufficiently cool, then the shrink film is removed. In order to remove the shrink film, the high temperature tape is removed from the ends of the shrink film, and the shrink film is unwound from the length of the assembly. The unwrapped assembly is ready for placement within a surge arrester or other uses.

The reinforcing structures described above can be applied to the component module of any surge arrester, including surge arresters rated greater than 6 kV, and, more particularly, rated between 6 kV and 800 kV, and can be applied to component modules to withstand a 100 kA current impulse. For example, the reinforcing structures can be applied to a component module of a 700 kV surge arrester used, for example, in a high voltage station application. Multiple layers of the fiber matrix pre-impregnated with a resin serve to provide two forms of mechanical reinforcement. The first form of reinforcement is to support the structure itself and reduce the need for the housing to provide mechanical support. As such, the housing can be reduced in size and thickness. This will advantageously reduce the cost of the resulting surge arrester.

It will be understood that various modifications may be made. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. An apparatus comprising:

a disk assembly including at least a first MOV disk defining a first surface and a second MOV disk defining a second surface, the first surface in direct contact with the second surface;

a reinforcing structure applied to at least a portion of one of the first MOV disk and the second MOV disk; and a removable film applied to the disk assembly and the reinforcing structure, the film being configured to compress the disk assembly.

2. The apparatus of claim 1, wherein the film being configured to compress the assembly comprises the film being configured to shrink in response to being heated to a first temperature.

3. The apparatus of claim 2, wherein the first temperature is a temperature below a melting temperature of the film.

4. The apparatus of claim 2, wherein the reinforcing structure includes a material that is viscous at the first temperature.

5. The apparatus of claim 1, wherein tension applied to the film compresses the disk assembly.

6. The apparatus of claim 5, wherein the film comprises a tape that does not shrink when heated.

7. The apparatus of claim 6, wherein the tape is attached to the disk assembly at an end of the disk assembly.

8. The apparatus of claim 5, wherein the film is spiral wound around the disk assembly.

9. The apparatus of claim 2, wherein the reinforcing structure includes a material that is viscous at the first temperature and the viscosity is such that the material does not flow between the first and second MOV disks.

10. The apparatus of claim 1, wherein the film is further configured to compress the reinforcing structure.

11. The apparatus of claim 10, wherein at least a portion of the reinforcing structure is between the film and one of the first and the second MOV disks.

12. The apparatus of claim 1, wherein the film is applied to the entire disk assembly.

13. The apparatus of claim 1, further comprising a terminal configured to electrically connect the assembly to an external device.

14. The apparatus of claim 1, wherein the reinforcing structure comprises a fiber matrix.

15. The apparatus of claim 14, wherein the fiber matrix is impregnated with epoxy and the fiber matrix includes a plurality of individual fibers that have an predetermined pattern relative to each other.

16. The apparatus of claim 1, wherein an interface is formed between the first surface and the second surface.

17. An apparatus comprising:

a disk assembly including at least a first MOV disk and a second MOV disk;

a reinforcing structure applied to at least a portion of one of the first MOV disk and the second MOV disk; and a film applied to the disk assembly and the reinforcing structure, the film being configured to compress the disk assembly such that a portion of the first MOV disk and a portion of the second MOV disk are coupled directly together along an axial direction.

18. The apparatus of claim 17, wherein the first MOV disk and the second MOV disk are directly coupled together without an intervening material.

19. The apparatus of claim 17, wherein the reinforcing structure comprises a fiber matrix comprising epoxy.

20. The apparatus of claim 1, wherein the film is applied to substantially the entire disk assembly.

21. The apparatus of claim 1, wherein the film is configured to circumferentially compress the disk assembly.

22. An apparatus comprising:

a disk assembly including at least a first MOV disk defining a first surface and a second MOV disk defining a second surface, the first surface in direct contact with the second surface;

a reinforcing structure applied to at least a portion of one of the first MOV disk and the second MOV disk; and a film applied to the disk assembly and the reinforcing structure, the film being configured to compress the disk assembly, wherein the film being configured to compress the assembly comprises the film being configured to shrink in response to being heated to a first temperature.

* * * * *